United States Patent [19]

Schlosstein et al.

[11] Patent Number: 5,477,596
[45] Date of Patent: Dec. 26, 1995

[54] STRINGER/CLIP PLACEMENT AND DRILLING

[75] Inventors: Hugh R. Schlosstein, Renton; James D. McCowin, Enumclaw, both of Wash.

[73] Assignee: The Boeing Company, Seattle, Wash.

[21] Appl. No.: 225,197

[22] Filed: Apr. 4, 1994

Related U.S. Application Data

[63] Continuation-in-part of Ser. No. 996,806, Dec. 23, 1992, Pat. No. 5,299,894.

[51] Int. Cl.⁶ .............................. B23P 21/00; B23B 41/00
[52] U.S. Cl. ........................ 29/33 K; 29/26 A; 29/281.5; 29/558; 29/703
[58] Field of Search .................................. 29/33 K, 34 B, 29/281.1, 281.3, 281.5, 557, 558, 33 R, 564.1, 564.7, 703

[56] References Cited

U.S. PATENT DOCUMENTS

| | | | |
|---|---|---|---|
| 3,889,343 | 6/1975 | Miller et al. | 29/809 |
| 4,203,204 | 5/1980 | Murphy | 29/281.1 |
| 4,203,204 | 5/1980 | Murphy | 29/703 |
| 4,310,964 | 3/1982 | Murphy | 29/703 X |
| 4,864,702 | 9/1989 | Speller et al. | 29/34 B |
| 4,995,146 | 2/1991 | Woods | 29/281.3 |
| 4,995,148 | 2/1991 | Bonomi et al. | 29/26 A |
| 5,105,515 | 4/1992 | Nelson | 29/281.1 |
| 5,127,139 | 7/1992 | McCowin | 29/26 A |
| 5,142,764 | 9/1992 | Whiteside | 29/559 |
| 5,154,643 | 10/1992 | Catania et al. | 29/34 B |

FOREIGN PATENT DOCUMENTS

| | | |
|---|---|---|
| 162281 | 12/1979 | Japan . |
| 162282 | 12/1979 | Japan . |

*Primary Examiner*—William Briggs
*Attorney, Agent, or Firm*—J. Michael Neary; John C. Hammar

[57] ABSTRACT

A machine for positioning clips in channel-shaped airplane fuselage stringers, and drilling holes in the stringers and clips, includes an elongated beam support having a box beam supported on five floor engaging legs and supporting a carriage assembly positioned on said beam and supported on bearings traveling along rails on the beam for longitudinal movement therealong. A motive mechanism, including a servomotor in the carriage and driving a pinion engaged with a rack fastened to the beam moves carriage longitudinally along the beam. An index mechanism including a fixed end stop at a known position indexes a stringer on the beam at a fixed reference position thereon. The stringer is centered under a drill by a centering mechanism mounted on the carriage, and a drill system drills a series of vertical holes along the channel floor of the stringer at locations specified in a digital product definition of said part. A multiplicity of clips is held in a clip cartrige for feeding the clips in order to a gripper for gripping, moving and placing a series of clips in the stringer channel and holding the clips in a specified position while they are drilled by two opposed drills disposed on a horizontal axis orthogonal to the stringer axis for drilling through side walls of the stringer and the clip positioned in said stringer. A pads positioner mounted for lateral movement toward and away from the axis of the stringer receives the clip cartrige and positions clips from the cartrige at a specified position to be gripped and picked up by the gripper. A position feedback and control system receives product definition information from a central product definition repository and translates the product definition information into machine instructions for moving elements of the machine to correct positions for drilling holes in the stringer and stringer clip to match corresponding holes drilled in airplane fuselage panels and frames to enable the parts to be positioned accurately with respect to each other without use of hard tooling.

12 Claims, 28 Drawing Sheets

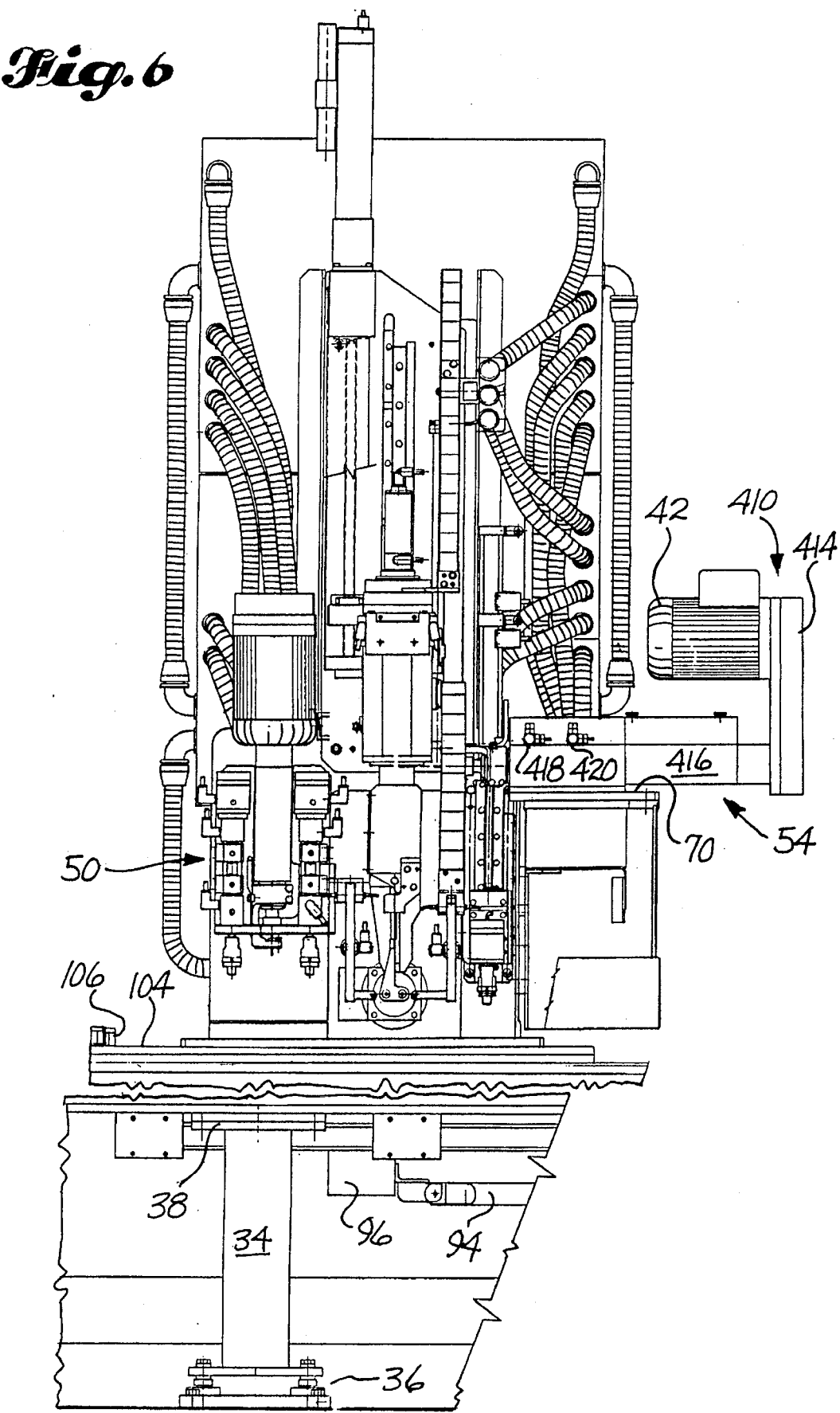

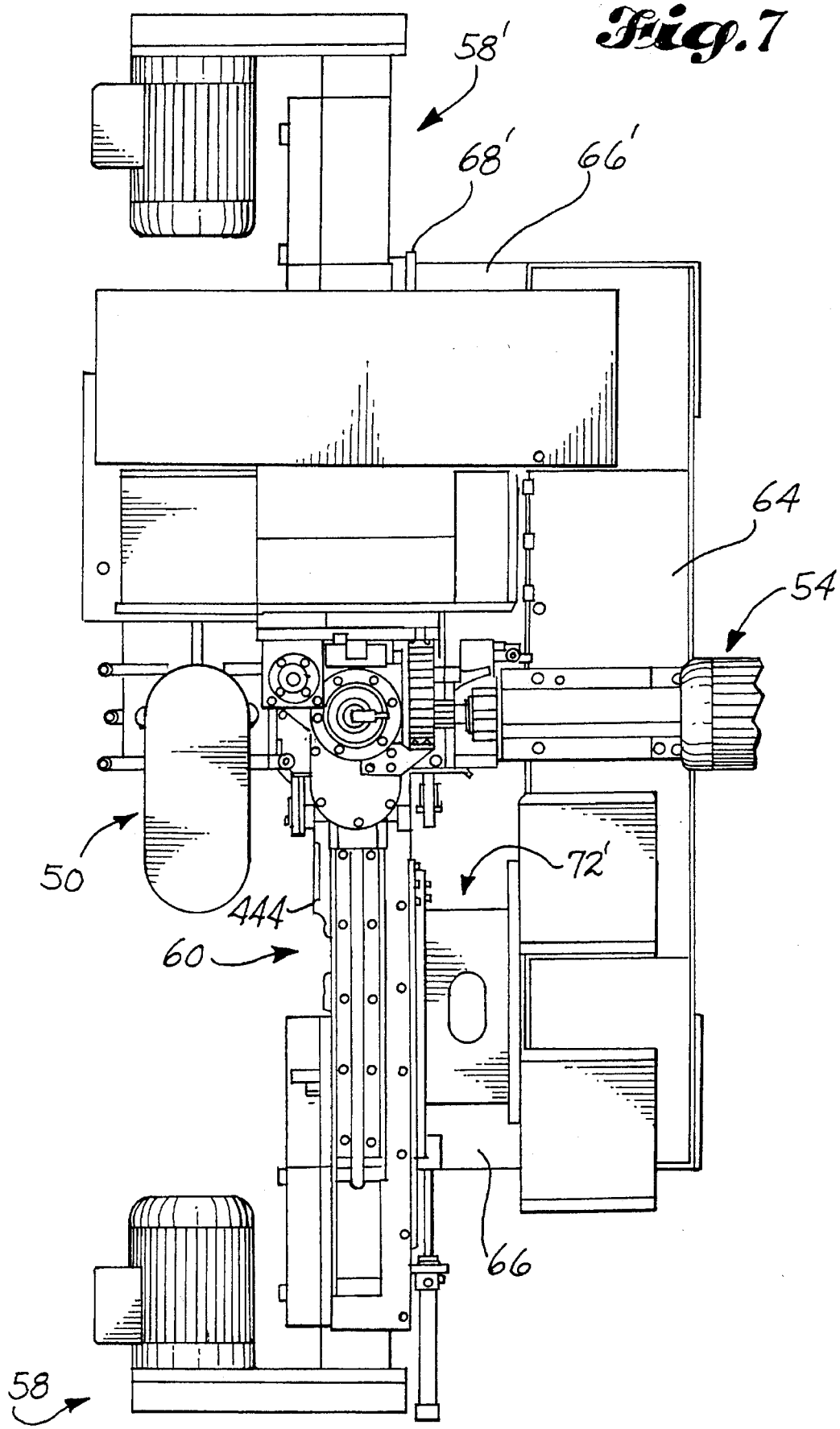

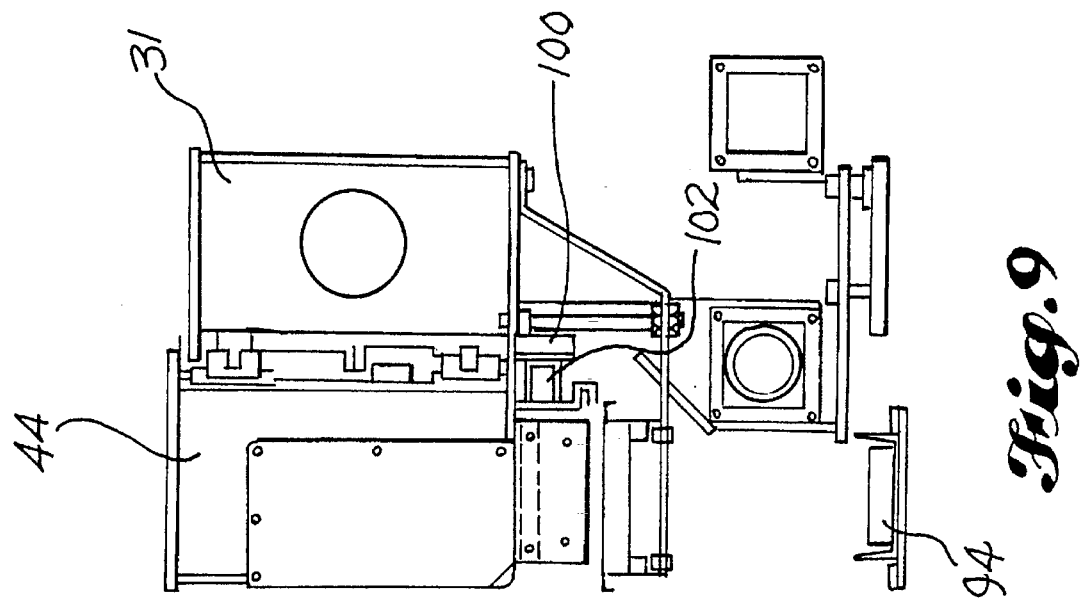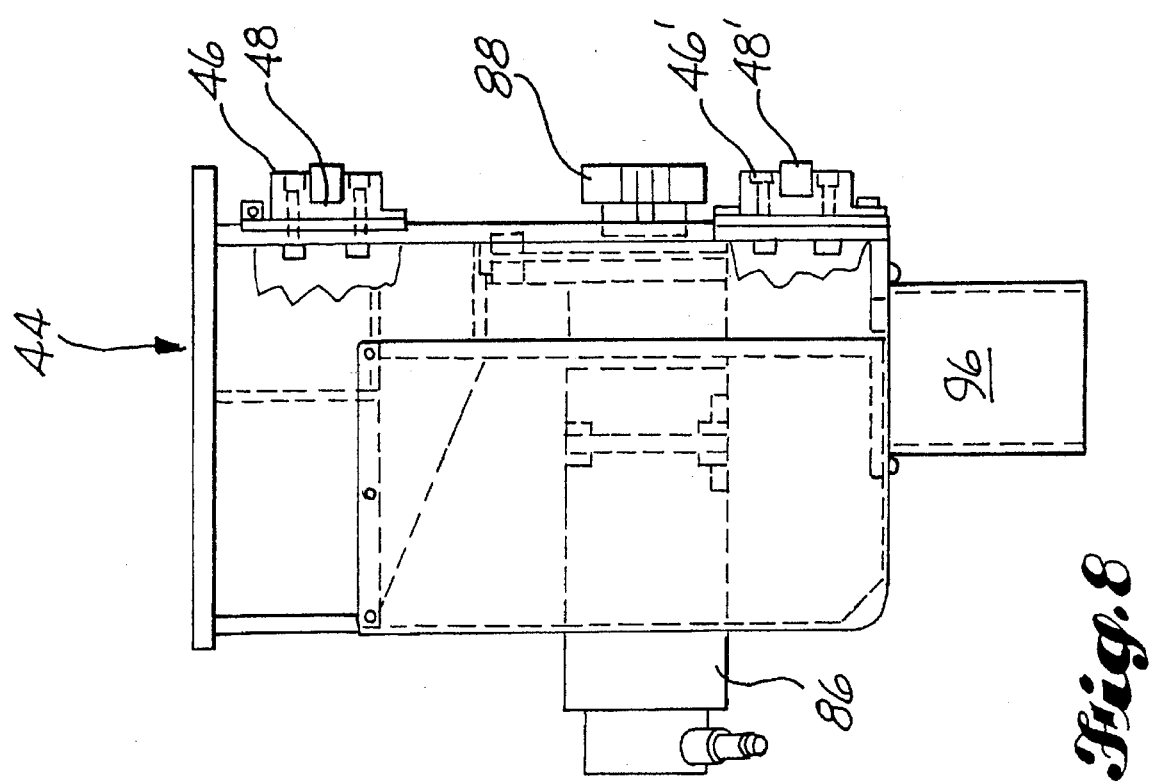

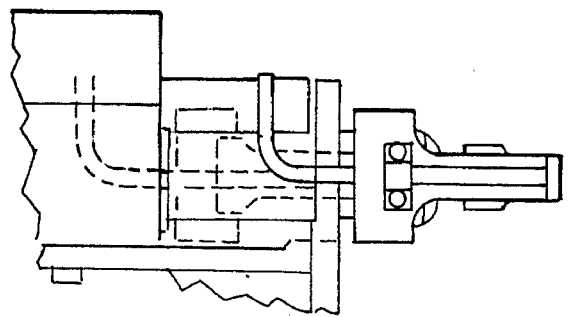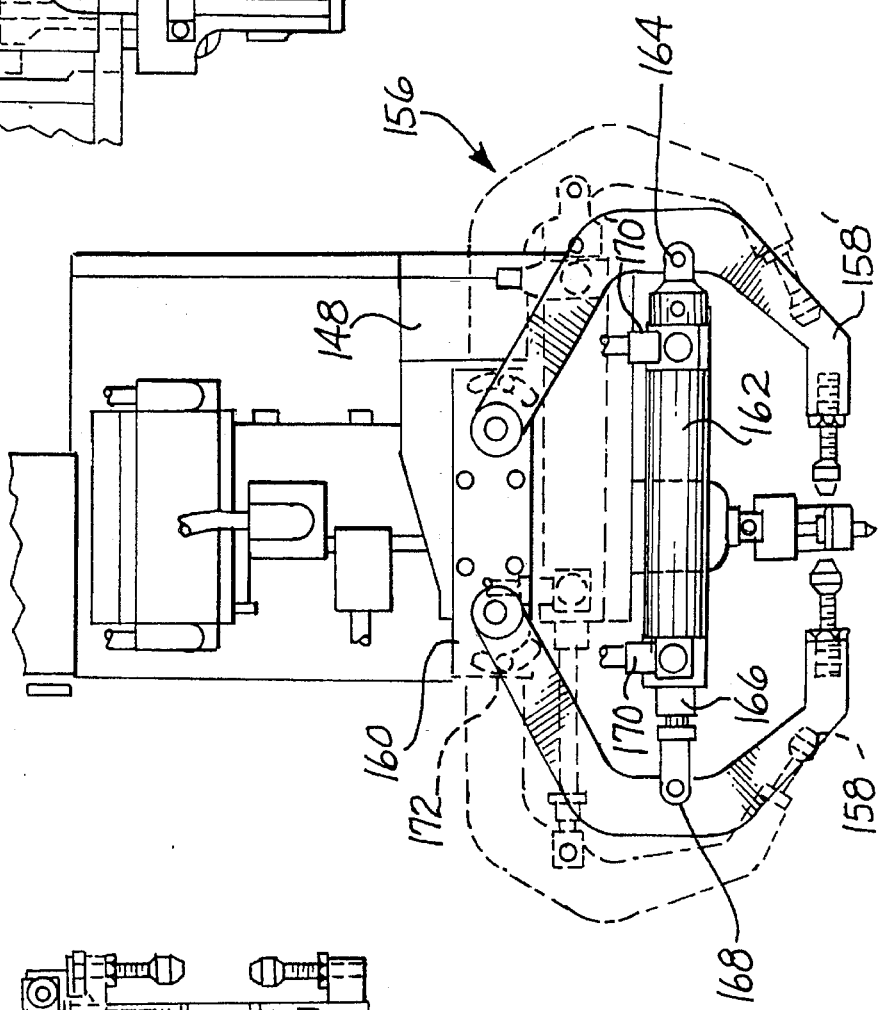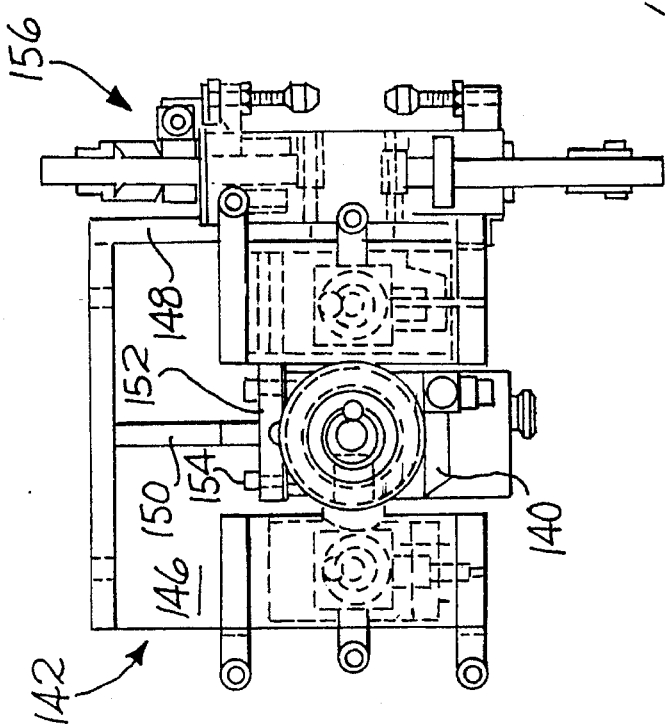

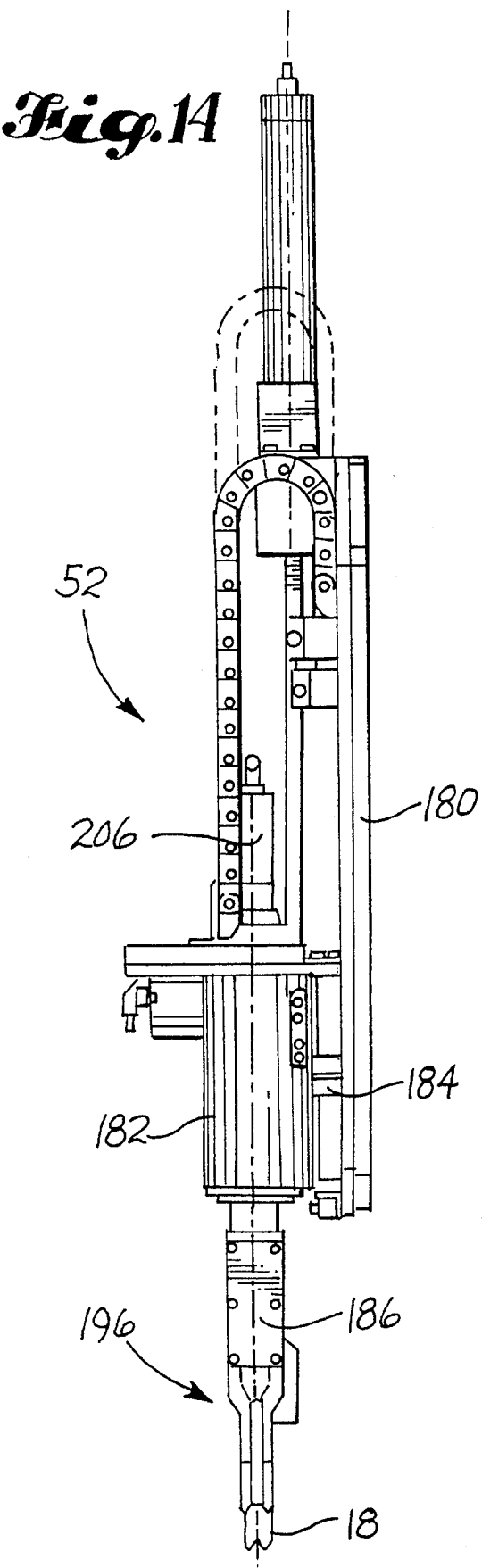
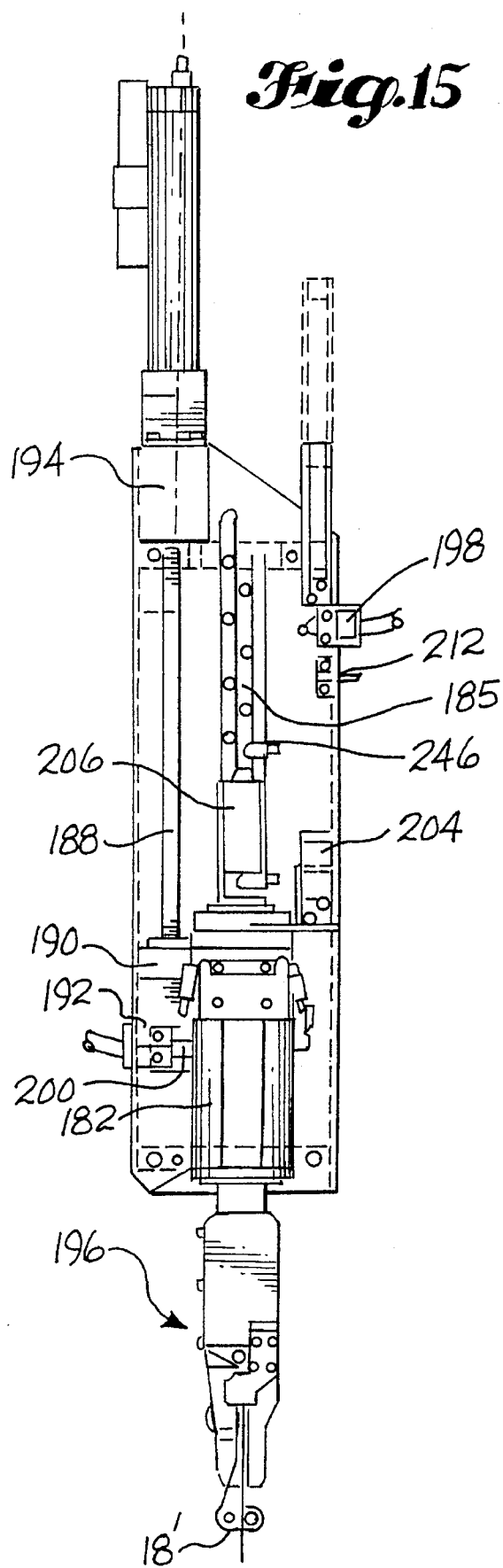

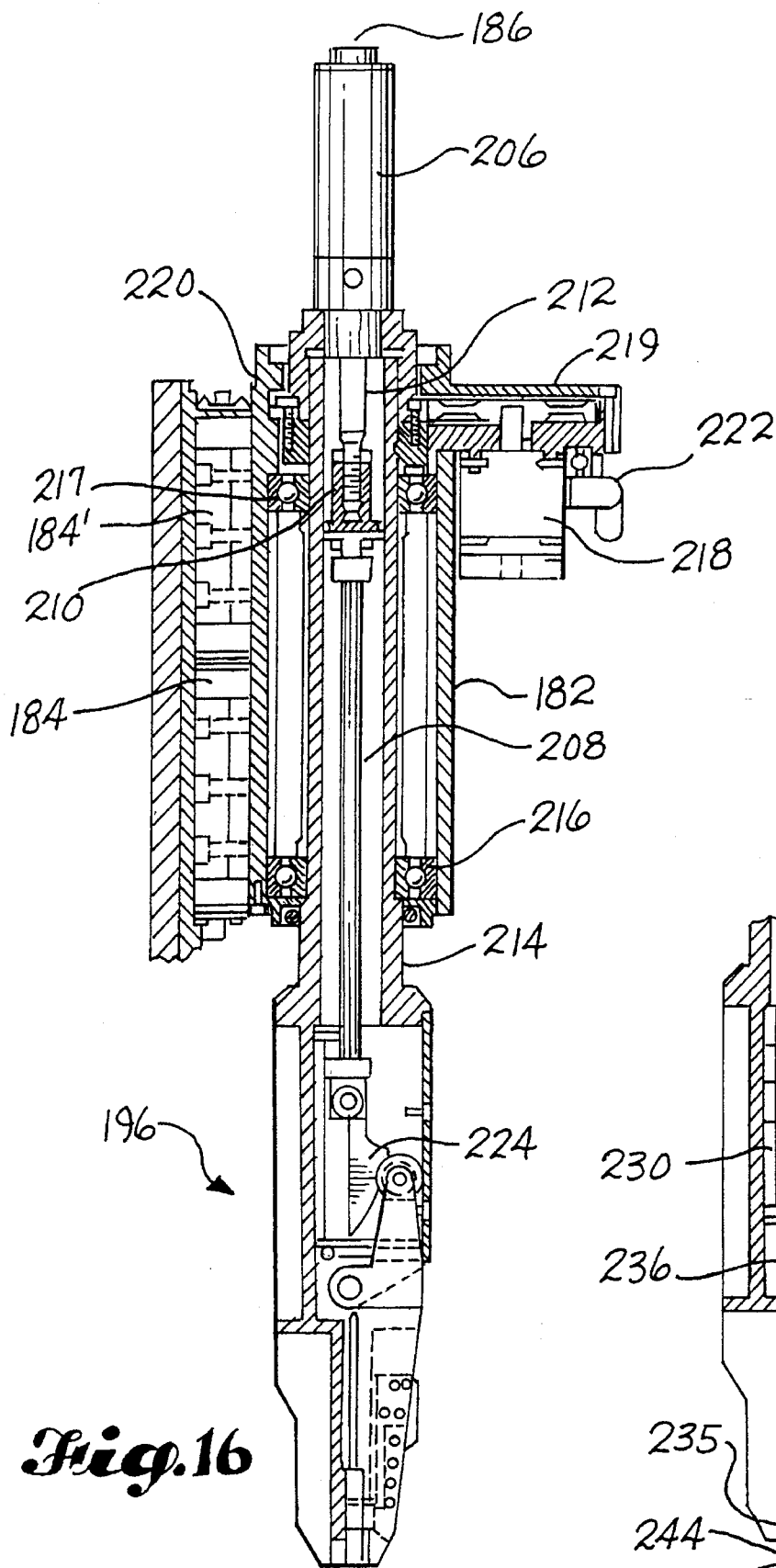
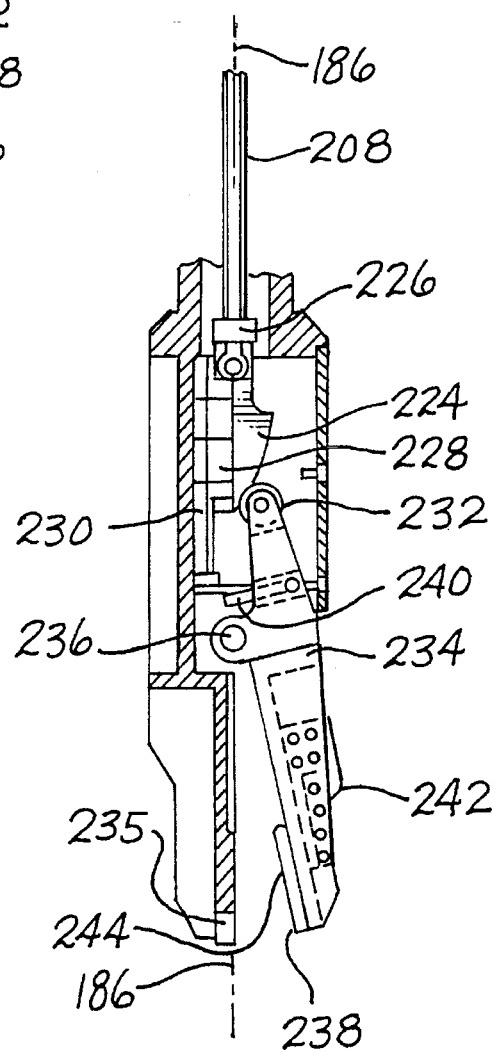
Fig.16
Fig.17

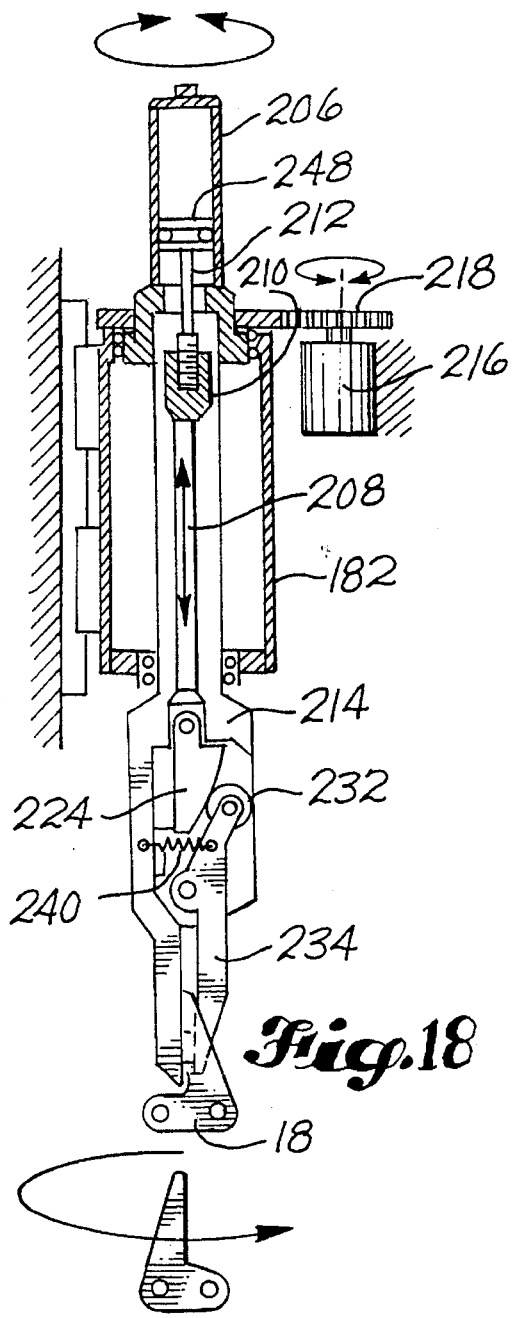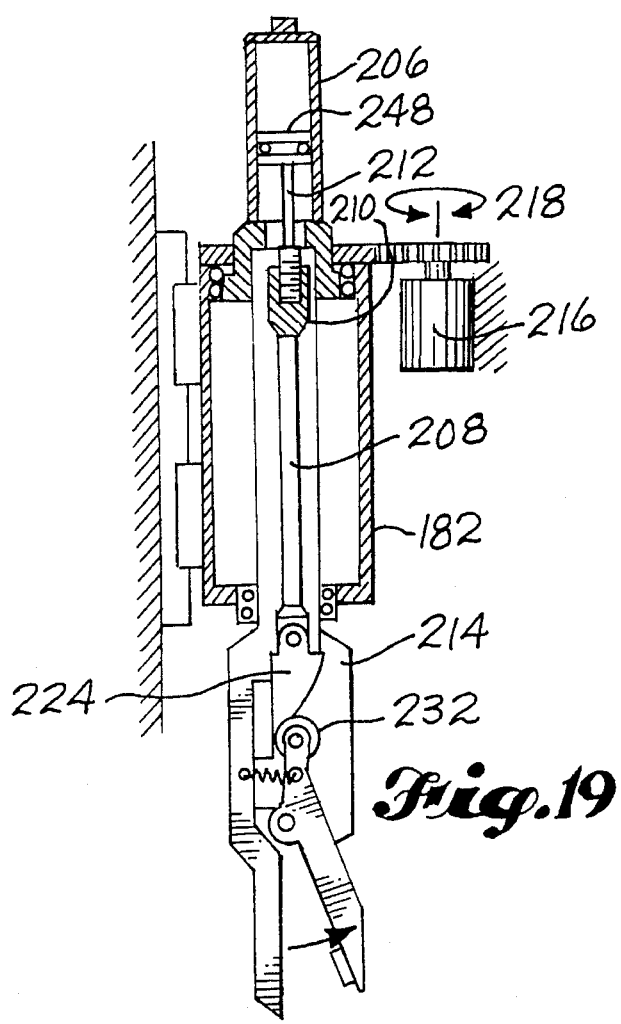

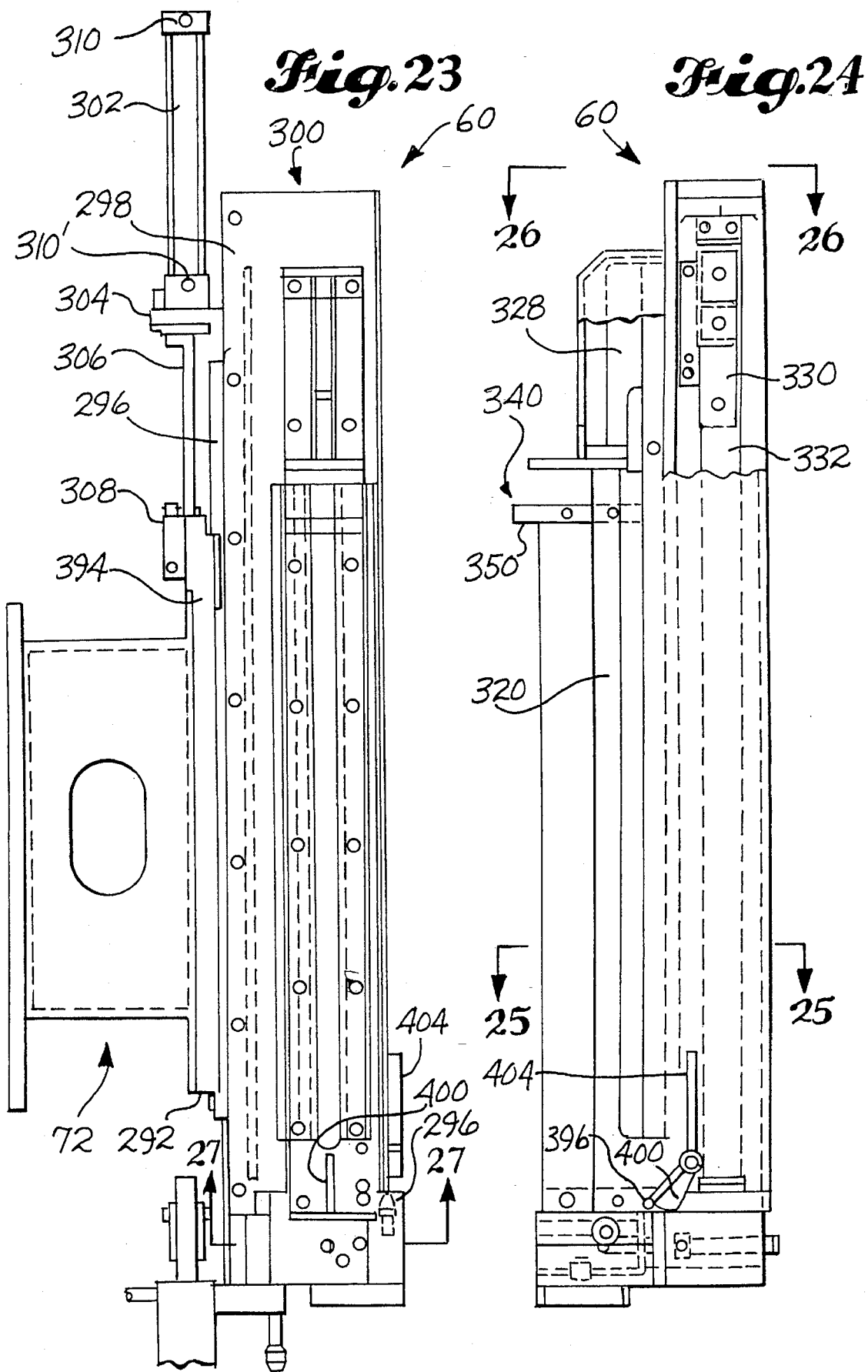

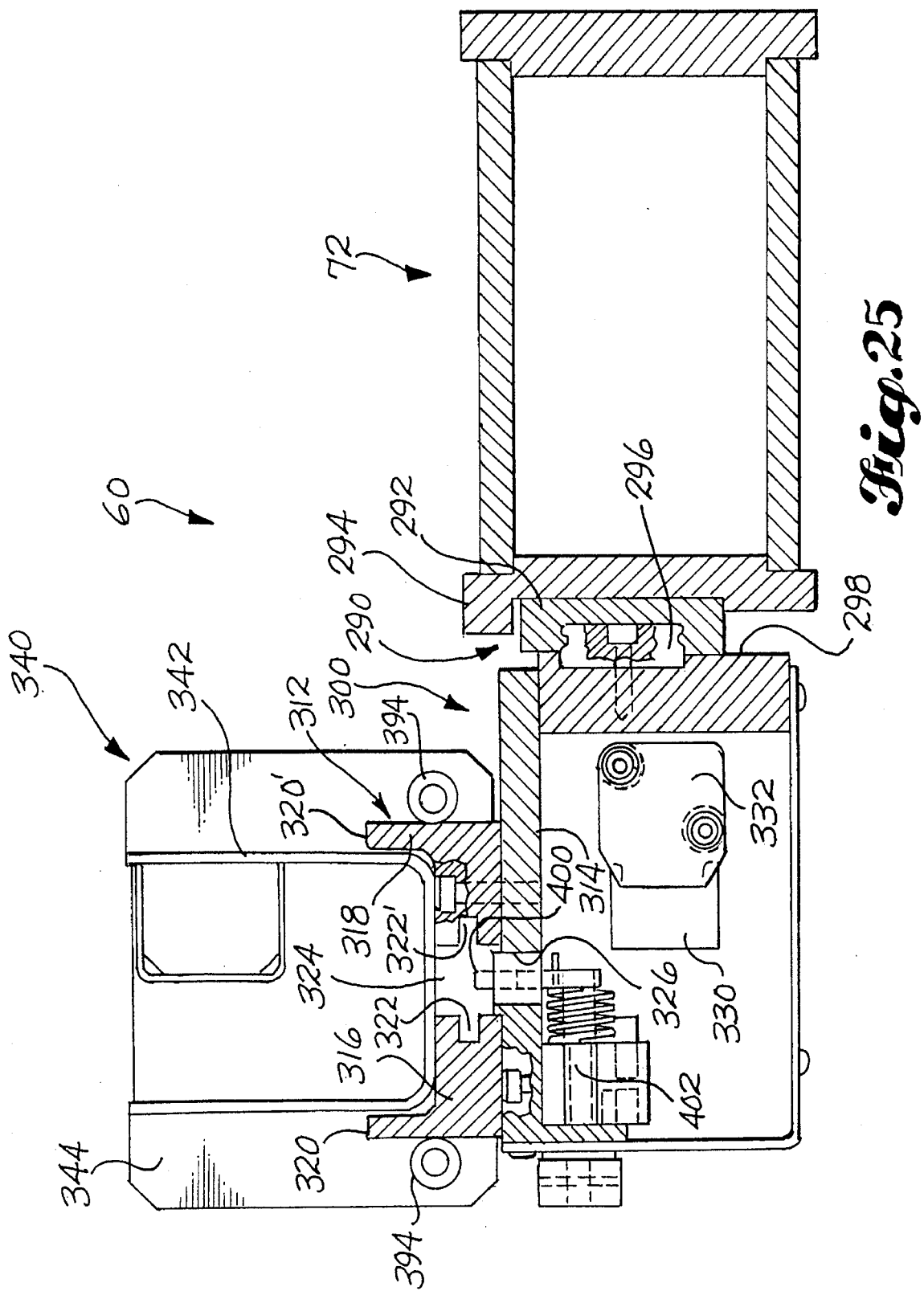

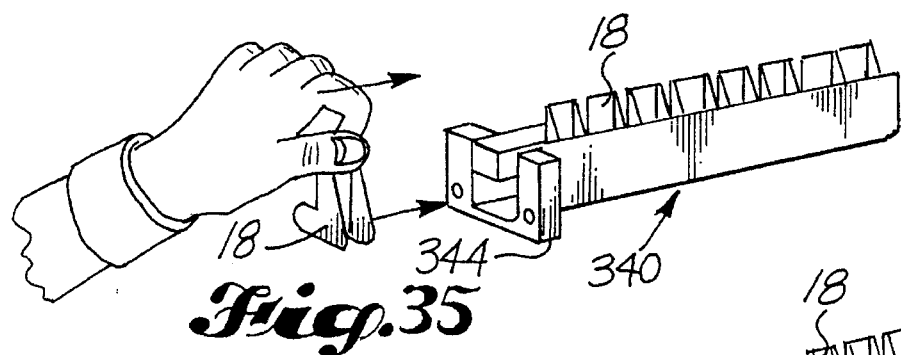
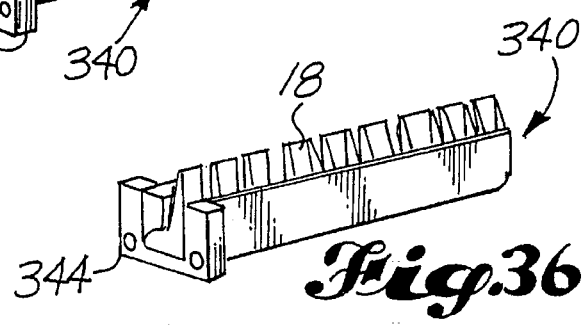
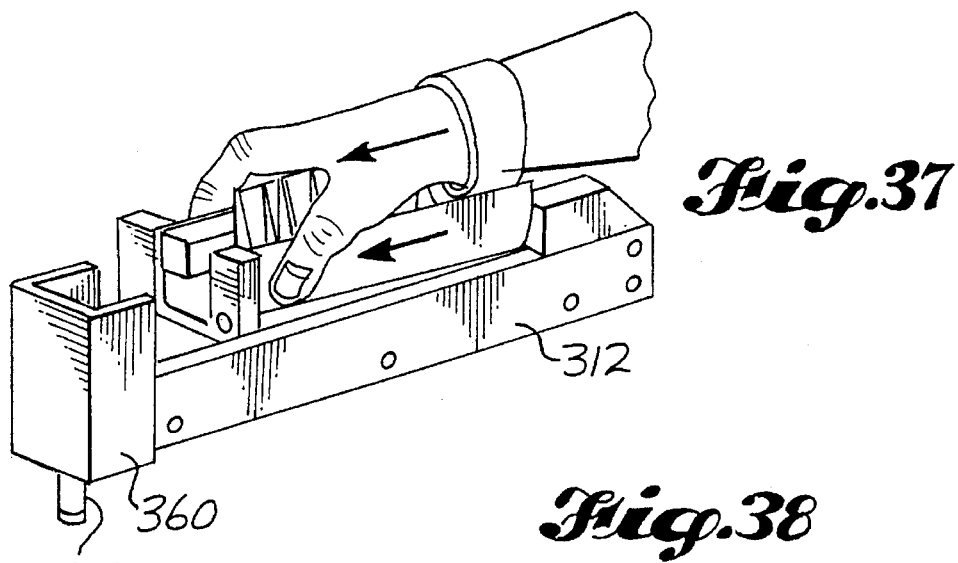
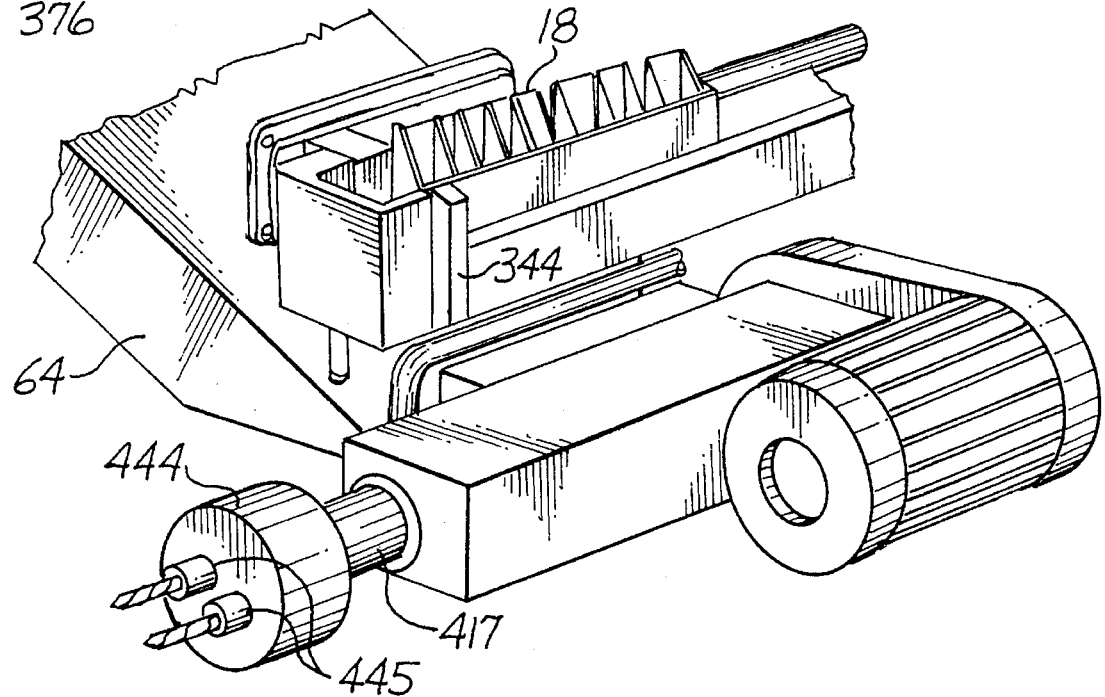

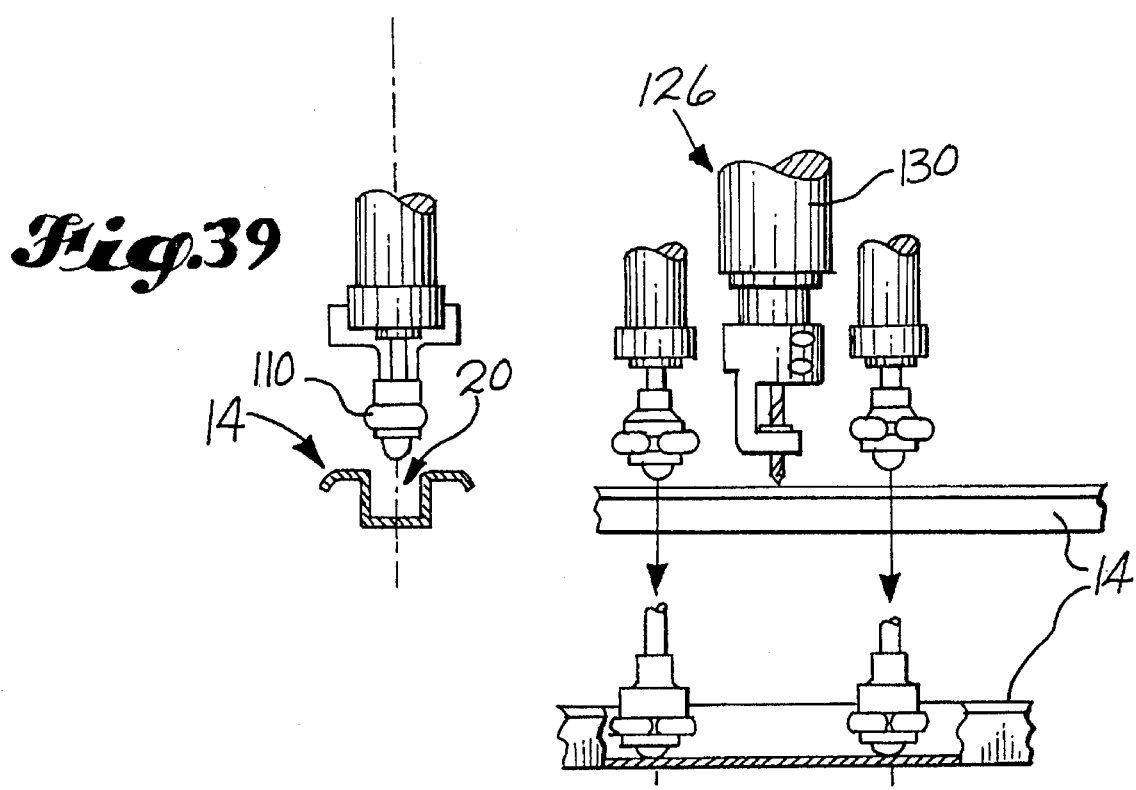
Fig.39
Fig.40
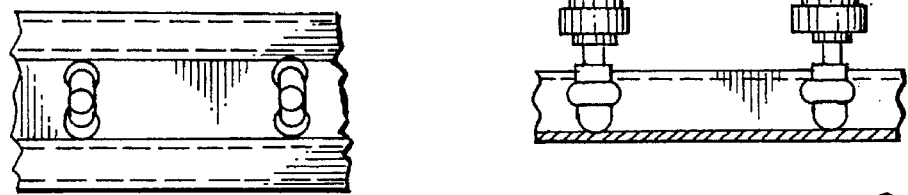
Fig.41
Fig.42 Fig.43
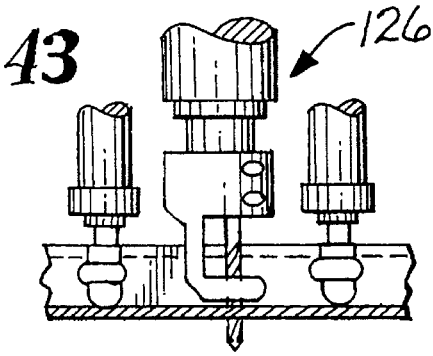

STRINGER/CLIP PLACEMENT AND DRILLING

This application is a continuation-in-part of application Ser. No. 07/996,806 filed on Dec. 23, 1992 and entitled "Workpiece Positioning and Drilling End Effector," now U.S. Pat. No. 5,299,894 issued on Apr. 5, 1994.

BACKGROUND OF THE INVENTION

This invention relates to automated drilling of coordination holes in parts for later assembly in a configuration determined by the location of the coordination holes, and more particularly to a method and apparatus for drilling coordination holes in stringers and stringer clips used in fabrication of transport airplanes.

A recent development in fabrication and assembly of commercial airplanes is the concept of "virtual tooling" in which the positions of parts and even the shape of the final assembly is determined by the shape and locations of parts relative to each other, and those positions are determined exclusively by the use of coordination holes drilled precisely in the parts at locations specified in the original engineering parts definitions. The set-up of the machines used to drill the coordination holes in the parts is done automatically using digital inputs from the original engineering parts definitions as the sole authority, so the possibility of error caused by misadjustment or manufacturing errors in hard tooling, as was experienced in the past, is eliminated. These hard tooling jigs and fixtures were always subject to errors during initial fabrication which, because of the complexity of the tooling design, might escape detection and produce defective parts from the beginning, or were subject to damage by rough use in the factory.

A breakthrough was made in the "virtual tooling" technology in a system disclosed in the following patent applications:

| Appln S/N | Title | Filed | Patent No. |
| --- | --- | --- | --- |
| 07/682,622 | Stringer Clip End Effector | April 8, 1991 | 5,127,139 |
| 07/871,321 | Reconfigurable Holding Fixture | April 20, 1992 | 5,249,785 |
| 07/964,533 | Panel and Fuselage Assembly | Oct. 13, 1992 | |
| 07/996,806 | Workpiece Positioning & Drilling End Effector | Dec. 23, 1992 | 5,299,894 |
| 08/002,364 | Part Positioning and Drilling End Effector | Jan 6, 1993 | |

The system disclosed in these applications and patents uses a central robot which routes the edges of the panel held on a configurable fixture, and uses several different end effector to pick up parts from a parts presentation station and hold them in position against the panel while coordination holes are drilled through the part and the panel. The results obtained from use of this system has exceeded expectations in terms of consistent accuracy, but the capacity of the system is limited and adding additional systems to increase capacity was disfavored because of the cost of the central robot. Moreover, the amount of load that the robot can accurately carry and position in space places physical restrictions into the design considerations for the end effectors, resulting in use of light duty mechanisms that requires rigerous maintenance to ensure their accurate operation. However, despite and because of these problems, sufficient confidence in the virtual tooling concept was developed from experience with the original system that it was decided that the an expansion of the system would be warrented. The expansion concept is to remove the function of pads drilling from the panel cell and perform that function on machines dedicated solely to that purpose, thereby fleeing the robot from the time-consuming tasks of picking up pads and holding them against the panel while coordination holes were drilled, and changing end effectors needed for different tasks. The same original engineering parts definition will be used to program the machine controller of the machine that drills the coordination holes in the parts. If the machine is designed with sufficient accuracy and set-up checks, the coordination holes in the panel and the parts will line up perfectly when the part is at the correct position on the panel, resulting in a fabricated part that is within specifications and requires no shims. Dedicated machines designed in accordance with this expansion of the concept can be Much less costly to build and operate that the panel cell, and they can be designed to require little maintence and with even greater precision than was possible in the panel cell. Freed from the time consuming tasks required for drilling the parts, the panel cell would now be able to concentrate on routing the panel edges and drilling the coordination holes in the panel, thereby increasing the panel cell throughput.

SUMMARY OF THE INVENTION

Accordingly, it is an object of this invention to provide an improved machine for precisely and consistently drilling coordination holes in stringers and stringer clips in accordance with the original engineering part definition. Another object of this invention is to provide a stringer and stringer clip drilling machine that is self-checking to ensure that the machine is properly set-up before the parts are loaded into it. Yet another object of the invention is to provide a method of drilling holes in a stringer and stringer clip that are so accurate and repeatable that the holes can be used, without hard tooling, to position the parts accurately on a fuselage panel so that the stringer clips align within tolerance on a plane coinciding with the selected airplane fuselage frame so that the frame can be riveted to the clips without the use of shims.

The machine includes an elongated bed for supporting the stringer, and a stop block against which the end of the stringer is abutted and fastened to establish the position of one end of the stringer. The machine touches a probe against various key items on the machine, including the abutting face of the stop block, to confirm the position of those key items, and automatically adjusts the position feedback signals to accommodate errors in the positions of those key items. Two longitudinally spaced, vertically movable spreaders descend into the stringer channel and rotate to center the stringer laterally, and a vertically oriented drill descends and drills a coordination hole in the floor of the stringer channel. The machine travels axially along the bed to the next position and repeats the drilling procedure at the next channel floor hole position. After all the floor coordination holes are drilled, the machine begins placing stringer clips and drilling coordination holes in the stringer side walls and the stringer clips. A stringer clip is fed from a magazine into a presenter and lifted by the presenter to a position to be gripper and held by a vertically movable gripper for drilling of a frame coordination hole, and is then placed by the gripper into the channel of the stringer. The sides of the stringer are clamped and two pairs of opposed drills drill rivet holes through the sides of the stringer and the stringer clip. After all the clips are placed and drilled, the machine cycles back to the home position and the drilled stringer with the placed and drilled clips is removed from the bed and the next stringer is installed.

DESCRIPTION OF THE DRAWINGS

The invention and its many attendant objects and advantages will become more apparent upon reading the following description of the preferred embodiment in conjunction with the following drawings, wherein:

FIG. 1A is a perspective view of a section of a stringer and a stringer clip placed and drilled by the machine shown in FIG. 1;

FIG. 6 is a front elevation of the carriage and a portion of the bed of the machine shown in FIG. 1;

FIG. 7 is a plan view of the carriage of the machine shown in FIG. 1;

FIG. 8 is an enlarged end elevation of the truck of the carriage of the machine shown in FIG. 1;

FIG. 9 is an end elevation of the truck shown in FIG. 8 mounted on the bed of the machine shown in FIG. 1;

FIG. 11 is a plan view of the centering and channel floor drilling module shown in FIG. 10;

FIG. 12 is an enlarged end elevation of the centering and channel floor drilling module shown in FIG. 10;

FIG. 13 is an enlarged end elevation of the drilling guide for the lower end of the centering and channel floor drilling module shown in FIG. 10;

FIG. 14 is an end elevation of the gripper module shown in FIG. 1;

FIG. 15 is a front elevation of the gripper module shown in FIG. 14;

FIG. 16 is an enlarged sectional end elevation of the main body portion of the gripper module shown in FIG. 14, viewed from the opposite side from FIG. 14;

FIG. 17 is an enlarged sectional elevation of the jaw portion of the gripper module shown in FIG. 16, showing the jaw in its open position;

FIGS. 18 and 19 are schematic elevations of the main body portion of the gripper module shown in FIG. 14 to illustrate the operation;

FIG. 23 is a plan view of the clip feeding and presenting module on the machine shown in FIG. 1;

FIG. 24 is an elevation of the clip feeding and presenting module shown in FIG. 23;

FIG. 25 is a sectional elevation along lines 25—25 in FIG. 24;

FIGS. 35–38 are schematic views illustrating the process of loading clips into the machine shown in FIG. 1;

FIGS. 39–43 are schematic views showing the process used by the machine shown in FIG. 1 of centering the stringer and drilling a hole in the center of the stringer floor;

DESCRIPTION OF THE PREFERRED EMBODIMENT

Figure 1:
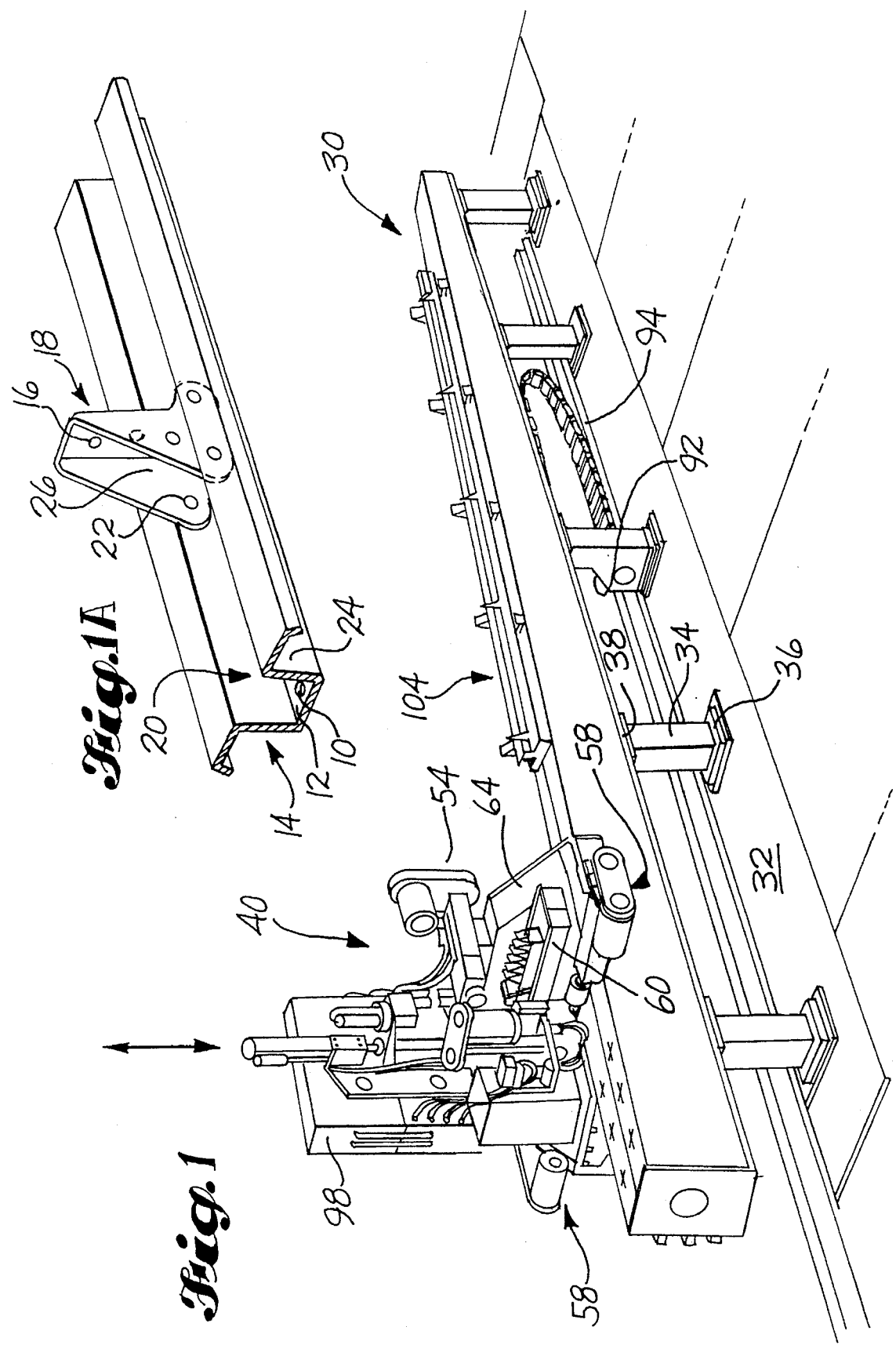
FIG. 1 is a perspective view of a stringer and stringer clip drilling machine in accordance with this invention.
Figure 2:
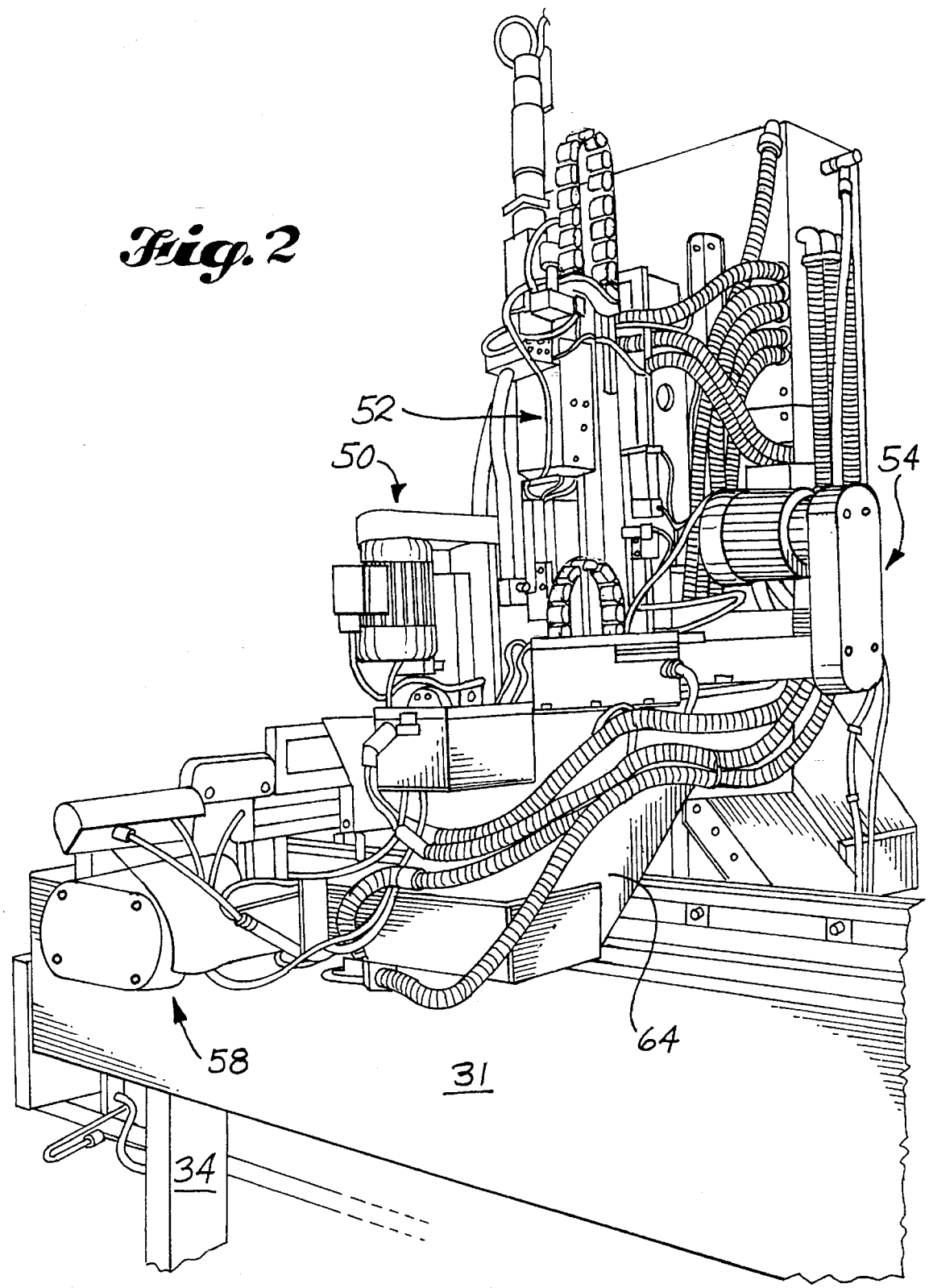
FIG. 2 is a perspective view of the upper carriage assembly of the machine shown in FIG. 1.

Turning now to the drawings, wherein like reference numerals designate identical or corresponding parts, and more particularly to FIGS. 1 and 1A thereof, a stringer and stringer clip drilling machine is shown for drilling coordination holes 10 in the floor 12 of a stringer 14, drilling a clip-to-frame coordination hole 16 in a stringer clip 18, inserting the clip 18 in the channel 20 of the stringer 14, and drilling four rivet holes 22 through the sides 24 of the stringer and the sides 26 of the clip 18. The machine has an elongated bed 30 supported on a floor 32 by a series of upright stanchions 34, each fastened between a floor engaging foot 36 and a capitol 38 engaging and supporting the bed on its underside. A carriage 40 is supported on the bed 30 for axial movement therealong. The carriage 40 includes a frame 42 connected to a truck 44 supported on bearings 46 that travel along a pair of parallel, vertically spaced rails 48 and 48' fastened to the back side of the box beam 31.

A group of operating modules for performing operations on the stringer and stringer clips is mounted on the frame 42. The modules are a centering and channel floor drilling module 50, a clip gripper module 52, a clip-to-frame coordination hole drilling module 54, a rear stringer centering and clamp-up jaw actuator module 56, two clip-to-stringer hole drilling modules 58 and 58', and a clip feeding and presenting module 60. The construction and operation of these modules will be described in detail below.

Figure 3:
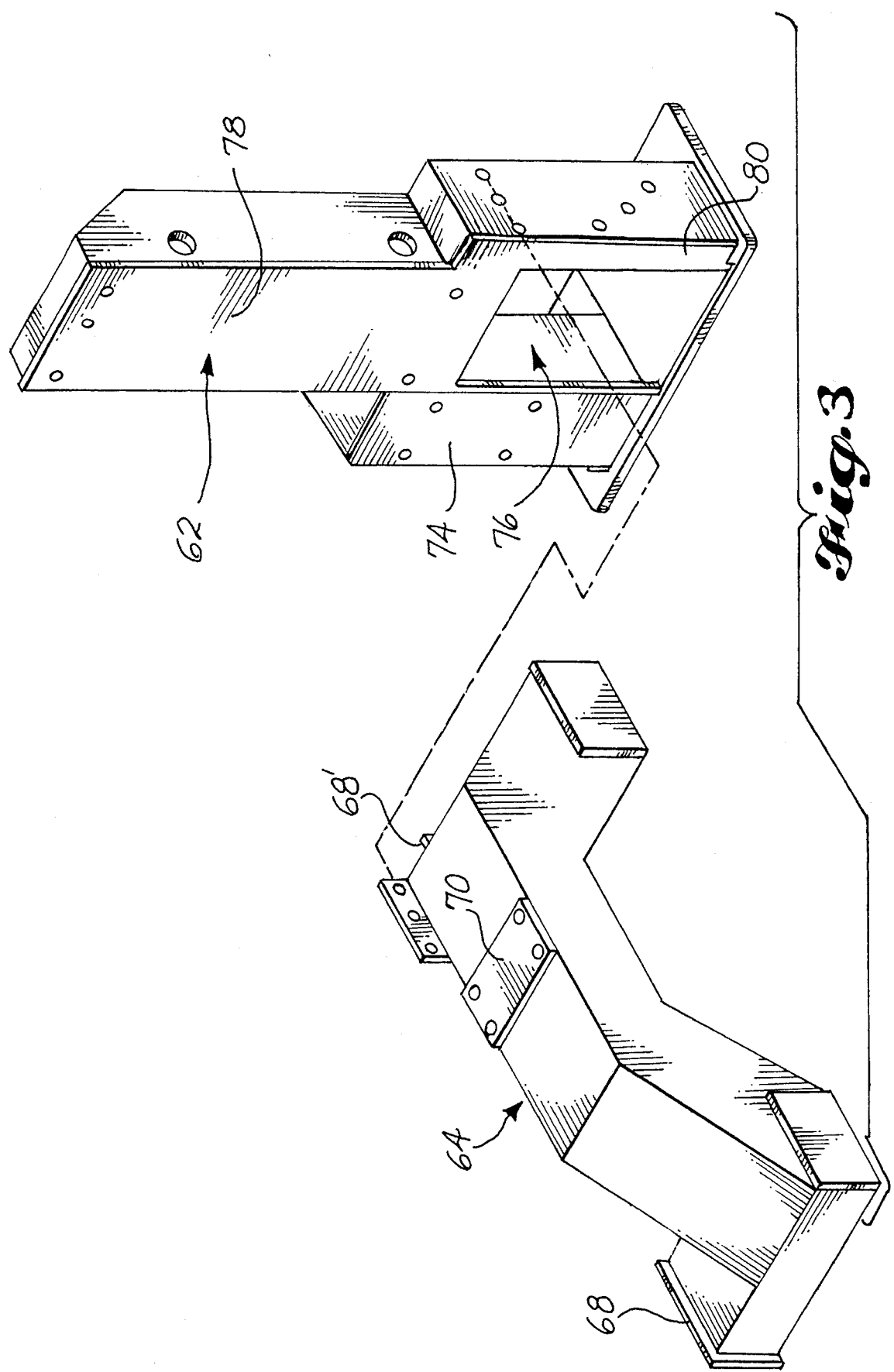
FIG. 3 is an exploded perspective view of the two main structural elements of the frame for the machine shown in FIG. 1.
Figure 4:
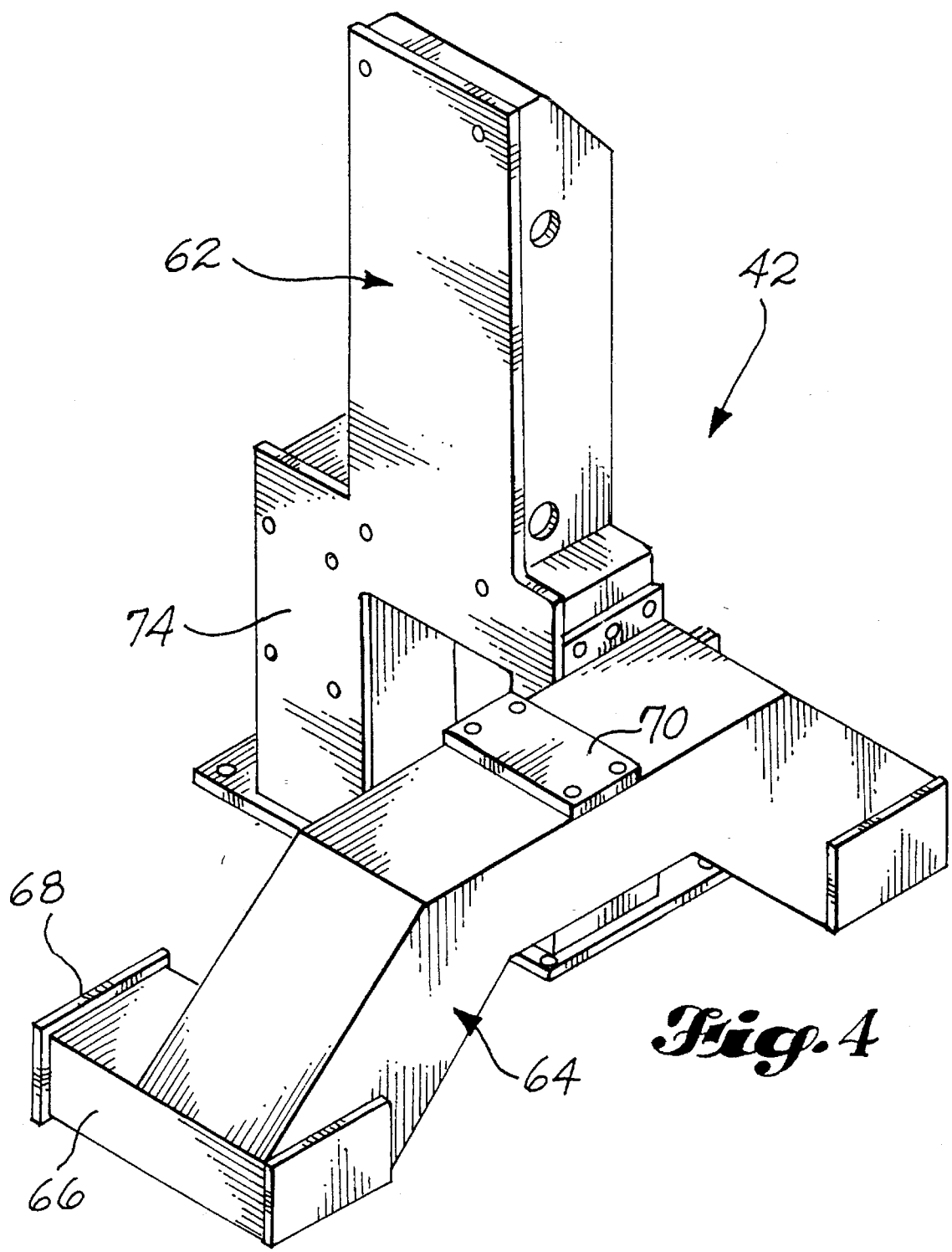
FIG. 4 is a perspective view of the assembled frame for the machine shown in FIG. 1.

The frame 42 for supporting the modules 50–60 is a two part construction shown in FIG. 3, including a frame upright 62 and a frame bridge 64. The frame upright 62 and the frame bridge 64 are fastened together as shown in FIG. 4 to provide a rigid frame 42 having mounting points to which the operating modules are connected. The bridge 64 includes a front end extension 66 having a mounting plate 68 mounted on the right end face of the front end extension 66 to which the front clip-to-stringer hole drilling module 58 is fastened. A similar extension 66' is mounted on the back end of the bridge 64 projecting to the right and supporting a similar mounting plate 68' to which the back clip-to-stringer hole drilling module 58' is mounted, as shown is FIGS. 5 and 7. The clip-to-frame coordination hole drilling module 54 is mounted on a mounting plate 70 fastened to the top of the frame bridge 64, and the clip feeding and presenting module 60 is mounted on a stand-off mounting structure 72. fastened to the right side of the forward portion of the bridge 64. The centering and channel floor drilling module 50 is mounted on an mounting panel 74 at the front side of the frame upright 62 to the right of a opening 76 through the lower central portion of the frame upright 62. The clip gripper module 52 is mounted on a mounting panel 78 at the upper central portion of the frame upright 62 above the opening 76, and the rear stringer centering and clamp up jaw actuator module 56 is mounted on a narrow mounting panel 80 to the right of the central opening 76 in the frame upright 62.

Figure 5:
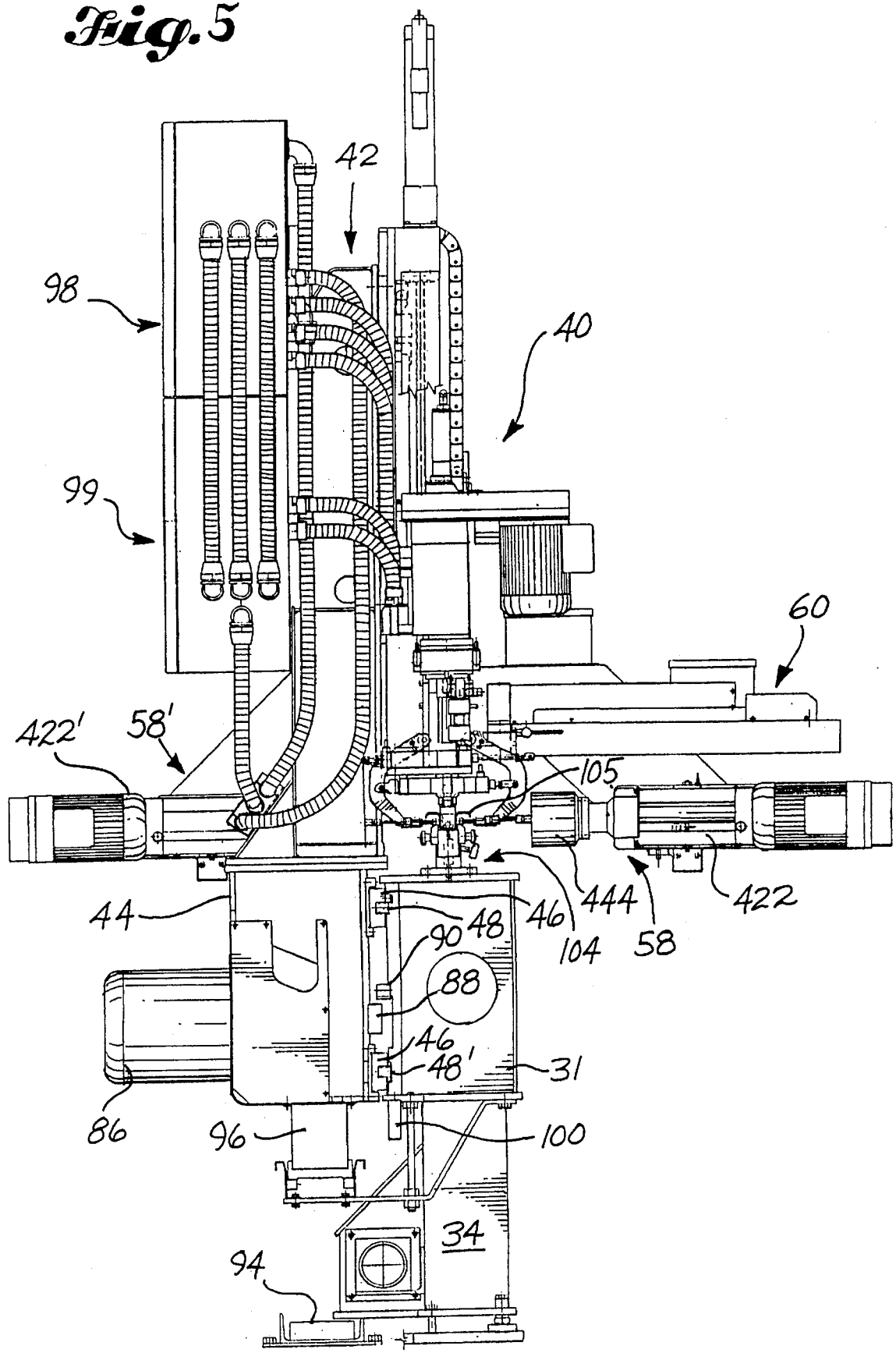
FIG. 5 is an end elevation of the machine shown in FIG. 1.

Turning now to FIG. 5, a positional motor 86 is shown mounted in the truck 44 and drives a pinion gear 88 which is engaged with a rack 90 fastened to the box beam 31 between the top and bottom rails 48 and 48'. The positional motor 86 is a servo motor with accurate feed back capability that enables it to provide information regarding the speed of translation of the carriage 40 along the bed 30.

Power for the positional motor 46 and the drilling motors for the modules on the carriage 40, and also air and lubrication lines for the actuators on the modules is conveyed to the carriage 40 from a connector box 92 along a flexible cable carrier 94 to a connection 96 on the underside of the truck 44. The electrical and pneumatic lines are conveyed up through the center of the frame upright 62 and into an upper pneumatic control box 98 and a lower electrical control box 99, which boxes contain the electrical and pneumatic controls for the motors and actuators in the operating modules on the carriage 40.

A positional scale 100 is mounted on the back side of the box beam 31 and a reader 102 is mounted on the underside of the truck 44 a position horizontally juxtaposed to the positional scale 100. The positional scale 100 and reader 102 in this preferred embodiment are elements of a Sony magnascale longitudinal position indicating system.

The bed 30 includes a stringer holding fixture 104, shown in FIGS. 1 and 5, fastened to the top surface of the box beam 31 for holding a stringer 105 in position under the axis of the machine. An end stop 106 at the end of the stringer holding fixture 104 locates the end of the stringer when it is abutted against the end stop so the position of the stringer is established by that reference position. With use of the reference position established by the end stop 106 and the longitudinal position sensor system 100 and 102, the control system for the machine (to be described below) is able to position the carriage 40 lengthwise along the stringer held on the stringer holding fixture 104 with great accuracy lengthwise along the path of the stringer so that the holes are drilled at the correct position.

Once a stringer 105 has been positioned on the stringer holding fixture 104 and secured in position at its right end against the stop 106, the carriage 44 is moved by energizing its positional motor to the first drilling location from the right hand end. The carriage is stopped with the axis 108 of the centering and channel floor drilling module 50 positioned over the location on the stringer where the hole is to be drilled.

The centering and channel for drilling module 50 shown in FIG. 6 and shown enlarged in FIG. 8 includes two spreaders 110 each mounted on a shaft 112 supported on a actuator 114 for axial vertical movement and rotation about the vertical axis. Axial extension of the spreader 110 on its shaft 112 is caused by pneumatic pressure through a fitting 116 which pressurizes a pneumatic actuator 118 to extend the shaft 112 and the spreader 110 vertically downward into the channel of the stringer positioned under the axis 108. While in the extended position, the spreaders 110 can be rotated by pressurizing a rotary actuator 120 through a pneumatic fitting 122.

After the spreaders 110 have been extended into the channel of the stringer and rotated to center the stringer under the access 108, motor 124 of a self feeding drill 126 is energized which rotates the shaft 128 of the drill and extends the quill 130 of the drill from its upper position illustrated in FIG. 8 to the lower position also illustrated in FIG. 8. A collet on 132 on the end of the shaft 128 holds a drill bit 134 which is supported in a drill bushing 136 fastened in the end of a drill guide 138 which is connected to the end of the quill 130. At the end of the plunge stroke, the quill 130 is retracted back up into the quill housing 140 and the motor 124 is automatically shut off.

The spreader actuators 114 and 114' and the drill 126 are mounted on a support bracket 142 having a vertical plate 144 and a horizontal shelf 146. A o side brace 148 extends from the vertical plate forward to the front edge of the horizontal shelf and is welded to the vertical plate on the horizontal shelf to provide support to the horizontal shelf. The support bracket 142 is bolted to the mounting panel 74 at the four bolt holes shown in FIG. 4.

As shown in FIG. 9, the support bracket 142 includes a center brace 150 35 welded between the vertical plate 144 and the horizontal shelf 146. An upright plate 152 is welded to the front end of the center brace 150 for supporting the quill housing 140 which is attached to the upright plate 152 by bolts 154.

Figure 10:
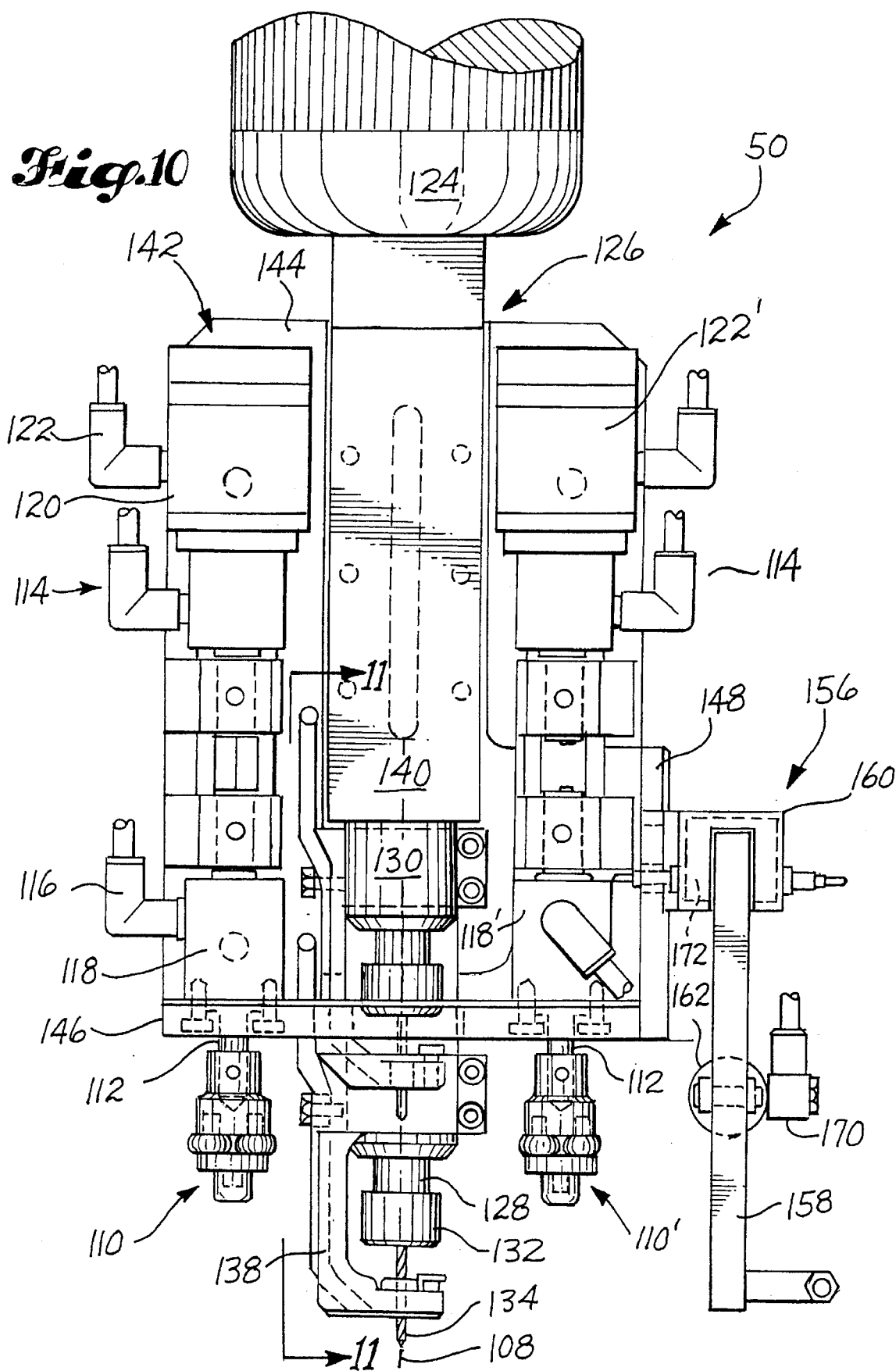
FIG. 10 is an enlarged front elevation of the centering and channel floor drilling module on the machine shown in FIG. 1.
Figure 21:
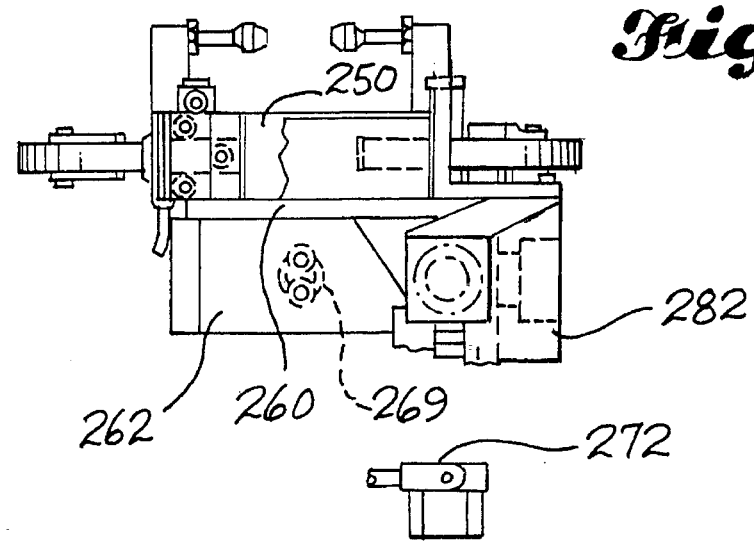
FIG. 21 is a plan view of the module shown in FIG. 20.

A clamp assembly 156 is attached to the right side of the side brace 148. The clamp assembly 156 includes two clamp arms 158 and 158' which are pivotally connected at a support block 160 which is bolted to the side of the side brace 148 as shown in FIGS. 9 and 10. A pneumatic cylinder 162 is pinned at 164 at an intermediate position on the arm 158'. A piston rod 166 extending from the pneumatic cylinder 162 is pinned at 168 to the intermediate portion of the other clamp arm 158. A pair of fittings 170 and 170' connects the pneumatic cylinder 162 to sources of pneumatic pressure controlled by valves in the control box 98 so that the cylinder 162 on opposite sides of the piston connected to the piston rod 166 can be selectively pressurized to open and close the arms 158 and 158' of the clamp 156. A sensor 172 is mounted in the support block 160 for detecting when the clamp arm 158 has moved to its clamped position. This is a signal to the control system that a stringer clip is clamped in the stringer and ready for drilling, as will be explained in detail below.

The gripper module 52, shown in the FIGS. 14–19, includes a mounting plate of 180 fastened to the mounting panel 78 above the opening 76 in the frame upright 62. A clamp actuator housing 182 is mounted on linear bearings 184 and 184' for vertical movement along a vertical axis 186. Vertical movement is effected by rotation of a ball screw 188 engaged with a ball nut 190 fastened to the top of the housing 182. The bottom end of ball screw 188 is held in a bearing in a end support 192, and the upper end of the ball screw 188 is driven by a servomotor 194 having highly accurate feedback capabilities to enable accurate positioning of the housing 182 and the clamp 196 supported in the housing 182, as described below. An upper limit switch 198 and an identical lower limit switch 200 are provided to cut the power to the servomotor 194 in the event that an aberration in the control system causes the servo motor 194 to drive the housing 182 beyond its normal limits toward a hard stop at either end of the travel along the rail 185, which could cause damage to the ball screw and/or ball nut. A home pulse switch 202 is provided in line with a trip vane 204 to provide an electrical signal when the body 182 reaches a reference position indicated by the height of the home pulse switch 202 on the mounting plate 180.

Turning now to FIG. 16, an air cylinder 206 is mounted on top of the body 182 for raising and lowering a rod 208 for operation of the clamp 196. The rod 208 is connected through a clevis 210 to the piston rod of the air cylinder 206.

A clamp body 214 is mounted on bearings 216 and 218 in the housing 182 for rotational motion about the axis 186. Rotational motion of the clamp body 214 is effected by a rotary actuator 216 coupled to a gear 218 journaled in the housing 182. The gear 218 is engaged with a gear 220, equal in diameter to the gear 218, fastened to the upper end of the clamp body 214. Operation of the rotary actuator 216 by pneumatic pressure delivered through a fitting 222 rotates the rotary actuator 216 through 180° which rotates the gear 220 through 180° . This rotational capability enables the clamp 186 to position the a clip 18 in the channel 20 of the stringer 14 in either of two 180° rotated positions.

A jaw cam 224 is pinned to the bottom end 226 of the rod 208 and is guided for vertical motion in the bottom end of the clamp body 214 by a miniature linear bearing 228 engaged with a rail 230 mounted on the clamp body 214. The jaw cam 224 engages a roller 232 pivotally mounted on the upper end of a jaw 234. The jaw 234 is mounted on a pivot pin 236 mounted in the clamp Is body 214. A pad 238 of resilient material such as polyurethane is mounted on the lower end of the jaw 234 for engaging and holding a clip 18 when the jaw cam 224 is lowered to force the roller 232 outward away from the axis 186 and pivot the jaw 234 about the pivot pin 236. A spring 240 opens the jaw 234 when the jaw cam 224 is lifted by the air cylinder 206 as illustrated in FIG. 17. A sensor 242 having a probe 244 detects when a clip is present in the jaws when the jaws close to provide feedback to the control system that a clip has been captured by the clamp 196 when the jaws close.

In operation, when the time in the cycle has arrived for a clip 18 to be picked up, the servomotor 194 rotates the ball screw 188, and the ball nut 190 engaged with a ball screw 188 travels down the ball screw carrying the housing 182 vertically downward guided by the bearings 184 and 184' on the rail 185. When the clamp has reached the correct vertical position as indicated by the control system monitoring the feedback from the servomotor 194, pneumatic pressure is delivered to the air cylinder 206 through a fitting 246 to drive the piston 248 in the air cylinder 206 downward, which drives the rod 208 and its connected jaw cam 224 downward into engagement with the roller 232 on the jaw 234, rotating about is pivot 236 to clamp the clip 18 between the jaw 234 and the lower end of the clamp body 214. The servomotor 194 is reversed to rotate the ball screw in the opposite direction to lift the clip to the desired height, as explained below.

Figure 20:
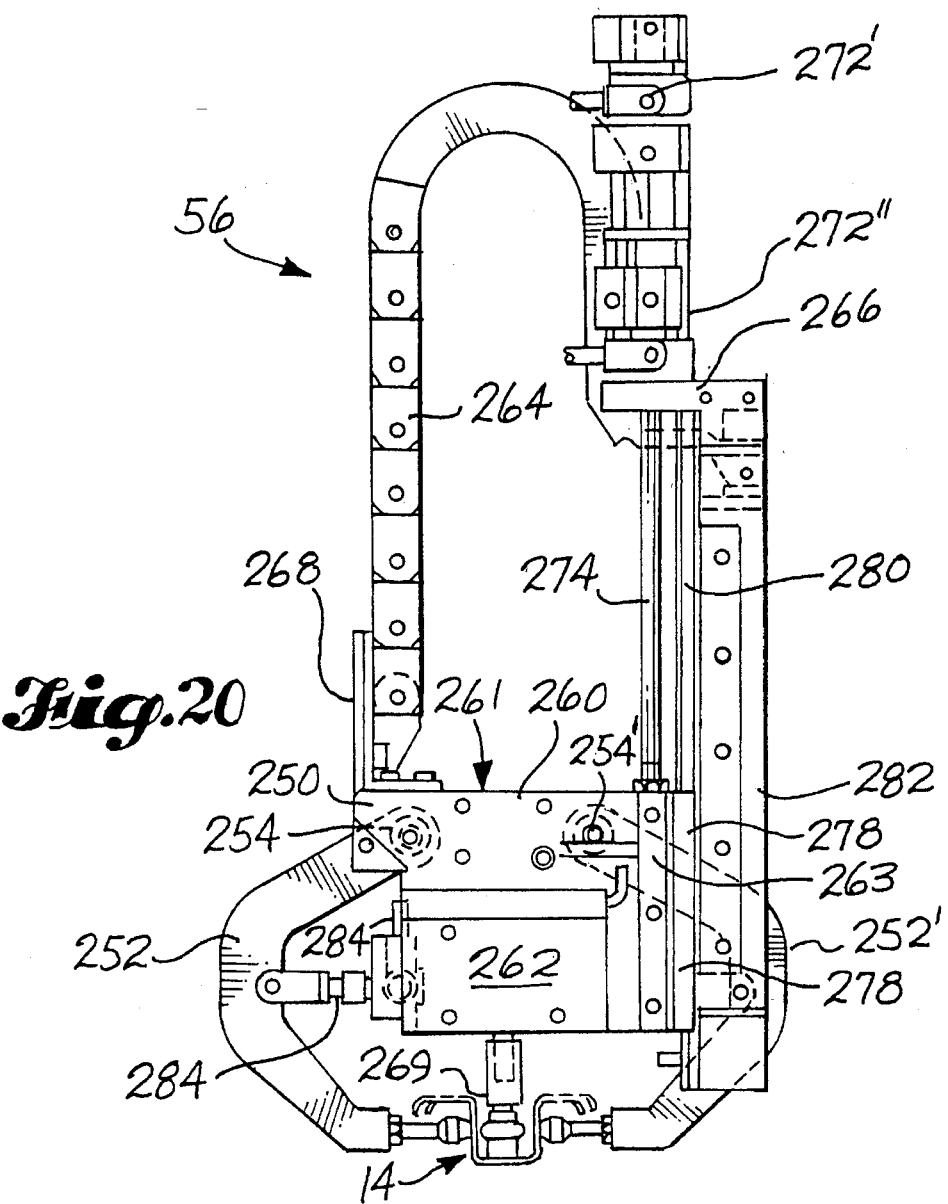
FIG. 20 is an end elevation of the rear centering and clamp-up jaw actuator module on the machine shown in FIG. 1.

Turning now to FIG. 20, the rear stringer centering and clamp jaw actuator module 56 is shown having a clamp support block 250 in which a pair of clamp arms 252 and 252' are supported for a pivotal motion about a pivot pins 254 and 254'. The clamp arms are actuated by a pneumatic cylinder 256 which is pressurized through a fitting 258. The cylinder 256 is pinned at one end to the arm 252' and a piston rod 259 connected to a piston in the cylinder is pinned to the other arm 252.

Figure 22:
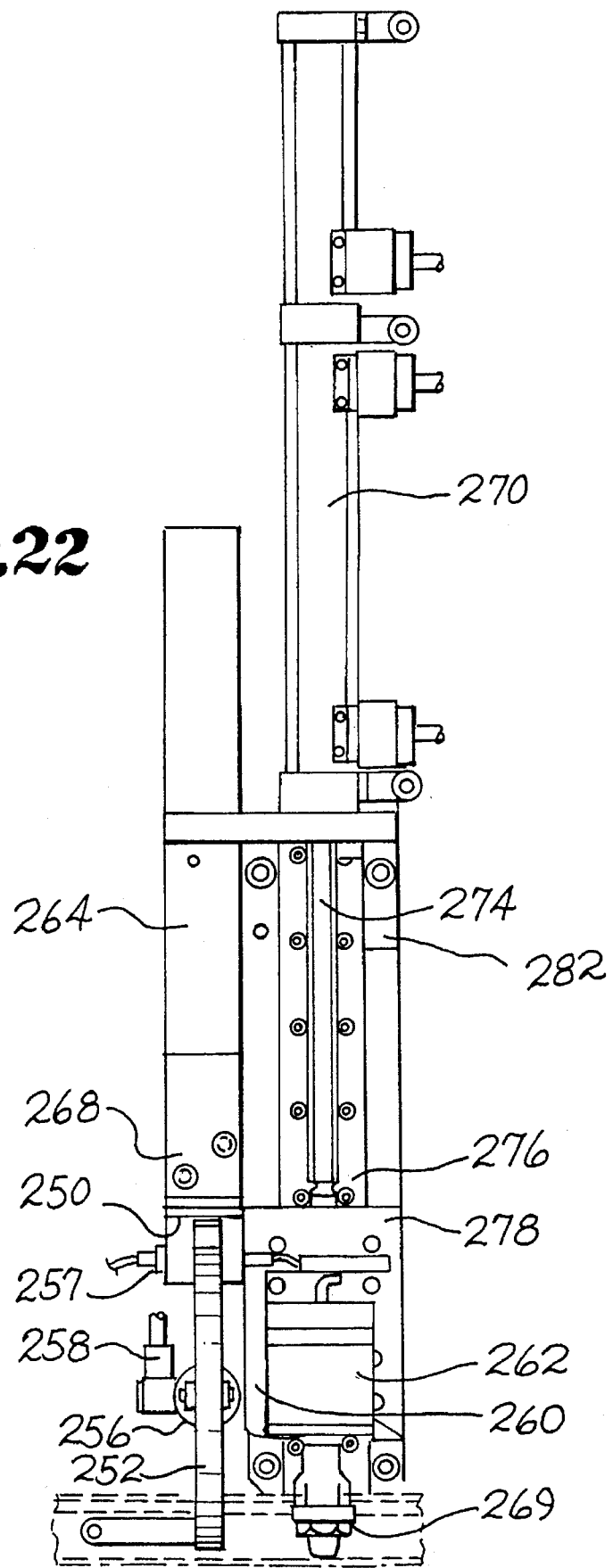
FIG. 22 is a front elevation of the module shown in FIG. 20.

The clamp support block 250 is fastened to the left side of a projecting vertical leg 260 of an L-shaped mounting bracket 261, as shown in FIG. The body of a rotary actuator 262, identical to the rotary actuators 120 on the centering and channel floor drilling module 50, is fastened to the other side of the leg 260. The mounting bracket 261 has an orthogonal leg 263 extending parallel to the front surface of the frame upright 62. A pair of linear bearings 278 are connected to the orthogonal leg 263 for vertically movable connection of the module 56 to the frame upright 62. Pneumatic power for the rotary actuator 262 is conveyed to the actuator 262 through a cable control chain 264 extending from a fixed flange 266 at the top end of a support plate 282 mounted on the frame upright 62 at the mounting panel 78. The cable control chain 264 is connected at the other end to a bracket 268 fastened to the clamp support block 250. Operation of the rotary actuator 262 rotates a spreader 269 projecting down from the rotary actuator to a position rotated 90° from the position illustrated in FIGS. 20 and 22.. The spreader 269 is identical in design to the spreaders 110 on the module 50.

The module 56 is vertically moveable under control of a three position air cylinder 270. Air to the air cylinder 270 is provided through fittings 272, 272' and 272". The three positions are provided to give an upper raised position to enable the machine to return to its home position clearing all of the stringer clips that have been inserted, an intermediate position used as to clear the way for the parts presenter (to be described below) when clips 18 are to be removed from a parts magazine and inserted in the stringer 14, and a lower operating position illustrated in FIG. 20 in which the spreader is positioned in the channel of the stringer and the clamp engages the stringer 14. A piston rod 274 extends from a piston inside the air cylinder 270 to a threaded hole in the top of the orthogonal leg 263 of the mounting bracket 261. Two bearing blocks 276 are fastened to the back side of the orthogonal leg 263 and are engaged with a rail 280 of a linear bearing which guides the vertical motion of the module 56. The rail 280 is fastened to the support plate 282 which is bolted to the mounting panel 78 on the frame upright 62.

In operation, the module 56 starts in its retracted position with the piston rod retracted fully into the air cylinder 270 and with the clamp and the spreader 273 in their fully elevated positions. When the air valve in the control box 98 controlling air flow to the air cylinder 270 is opened by the control system, the air cylinder 270 is pressurized above the piston attached to the piston rod 274, driving the piston and attached piston rod 274 downward to lower the spreader 263 into the channel of the stringer 14. The control system similarly pressurizes the rotary actuator 262 through fittings 284 which rotates the spreader 269 through 90° from the position shown in FIGS. 20 and 22. The spreader 269 slightly spreads the legs of the stringer 14 to the spread position indicated in Fig. 20 which facilitates the insertion of a clip 18 by the gripper module 52. The spreader 269 is then rotated back into its 0° position illustrated in FIG. 20 and the clamp arms 252 in 252' are closed to engage the sides of the stringer 14 to clamp the clip 18 securely within the stringer 14. While in this position and still held securely by the jaw 234 of the gripper module, four holes are drilled horizontally through the side of the stringer 14 and the sides of the clip 18, as will be described below, by the clip-to-stringer hole drilling modules 58 and 58'. Thereafter, the clamp arms 252 and 252' are released and the module 56 is raised back to its home position, leaving the drilled clip in place in the drilled stringer 14.

Turning now to FIGS. 23 through 25, the clip feeding and presenting module 60 as shown mounted on the stand-off mounting structure 72 by a set of linear bearings which enable the module 60 to move laterally toward and away from the central line of the machine, enabling the gripper module 52 to grip and remove a clip 18 from the pads presenting modules 60 and then carry the clip 18 straight down into the stringer after the pads presenting module 60 has traveled laterally away from the center line of the machine and clear of the path of the gripper module 52. The linear bearing 290 includes a pair of bearing blocks 292 fastened to the projecting ends of a flange 294 on the left side of the standoff mounting structure 72. The bearing blocks 292 are engaged with a rail 296 fastened to the vertical sidewall 298 of a pads presenter housing 300.

A pneumatic cylinder 302 provides the motive force for moving the pads presenter laterally toward and away from the center line of the pads gripper 52. The pneumatic cylinder 302 is connected to a mounting block 304 which is screwed to the side of the vertical sidewall 298 of the housing 300. A piston rod 306 extends from the cylinder 302 and is fastened at its distal end to a connector block 308 fastened to the front end of the flange 294. Air lines are connected to a pair of fittings 310 and 310' for selectively providing air pressure to one side or s the other of a piston in the cylinder 302 connected to the piston rod 306 for selectively moving the parts presenter laterally inward or outward toward or away from the center line of the gripper 52.

A cartridge bed 312 is screwed to the top plate 314 of the housing 300. The cartrige bed 312 is actually made of 2 mirror image parts 316 and 318 each having an upwardly extending flange 320 and 320' on their outside edges and a slot 322 and 322' milled along the inner facing edges to produce a cruciform slot 324 between the parts 316 and 318. The slot 324 and an aligned slot in the top plate 314 of the housing 300 receives a pusher arm 328 which is attached at its lower end to a shuttle 330 of a rodless cylinder 332. An air fitting 334 is connected to the rodless cylinder 332 through the vertical sidewall 298 of the housing 300 for energizing the rodless cylinder and driving the shuttle 330 and the attached pusher arm 328 longitudinal along the housing 330 toward the center line of the gripper 52. The air fitting 334 connects flexible air lines to the housing 300 so that the rodless cylinder 332 remains connected to a source of air pressure despite its lateral movement toward and away from the center line of the gripper 52.

A clip cartrige 340 is removable mounted on a cartrige bed 312. The clip cartrige 340 includes an elongated U shape channel 342 and an enlarged end plate 344. The clip cartrige 340 has an elongated slot through the floor of the channel from the rear end to the adjacent the front end to receive the pusher arm 328 which pushes the clips 18 forward in the U shape channel 342. An outer end plate 348 having a slot in the bottom aligned with a slot 346 in the floor of the U shape channel 342 is screwed to the end of the U shape channel 342. The outer end plate includes a bridge 350 at its top end which spans the channel and provides rigidity to the structure of the clip cartridge 340.

Figure 27:
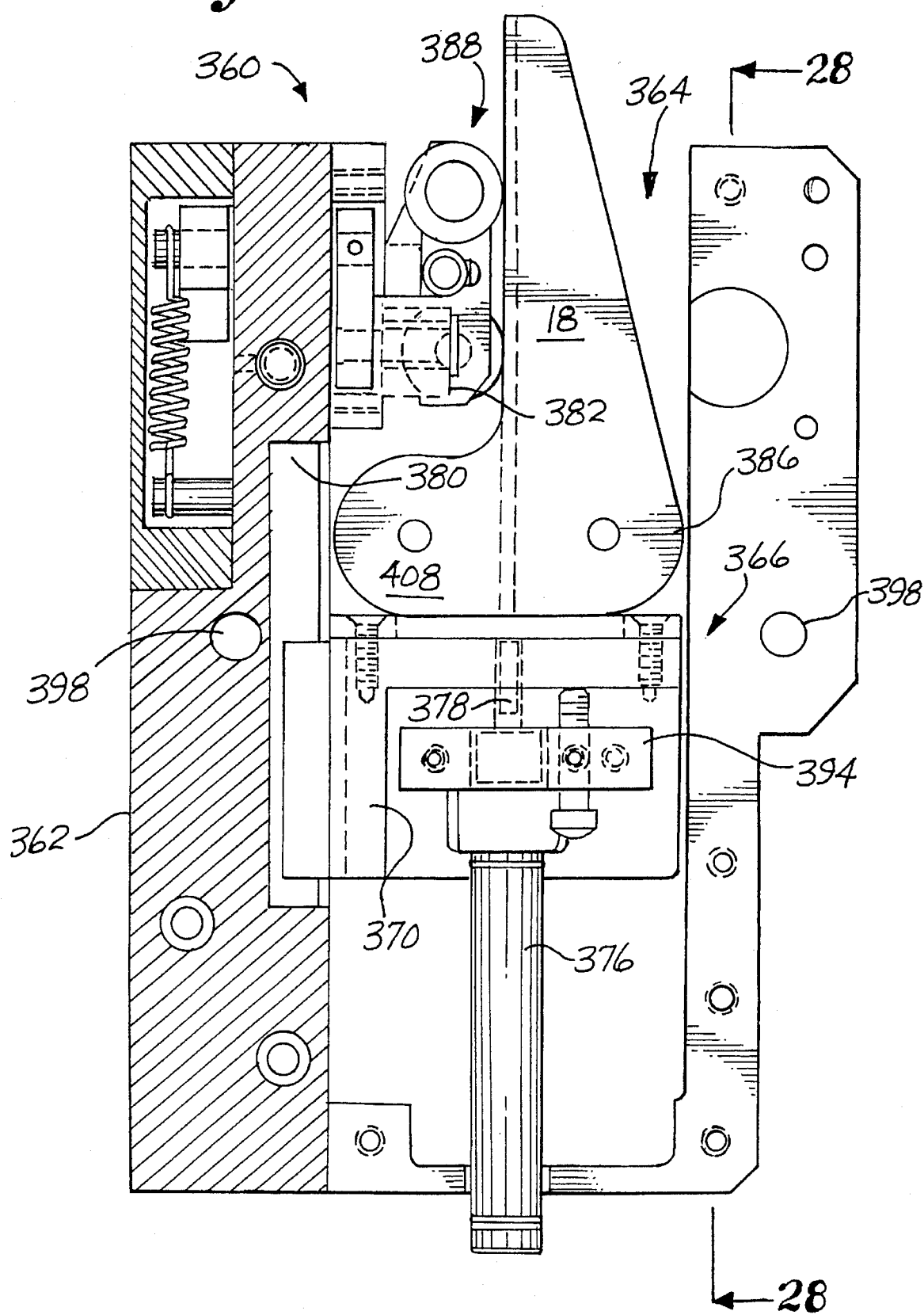
FIG. 27 is a sectional elevation of the clip presenter along lines 27—27 in FIG. 23.
Figure 28:
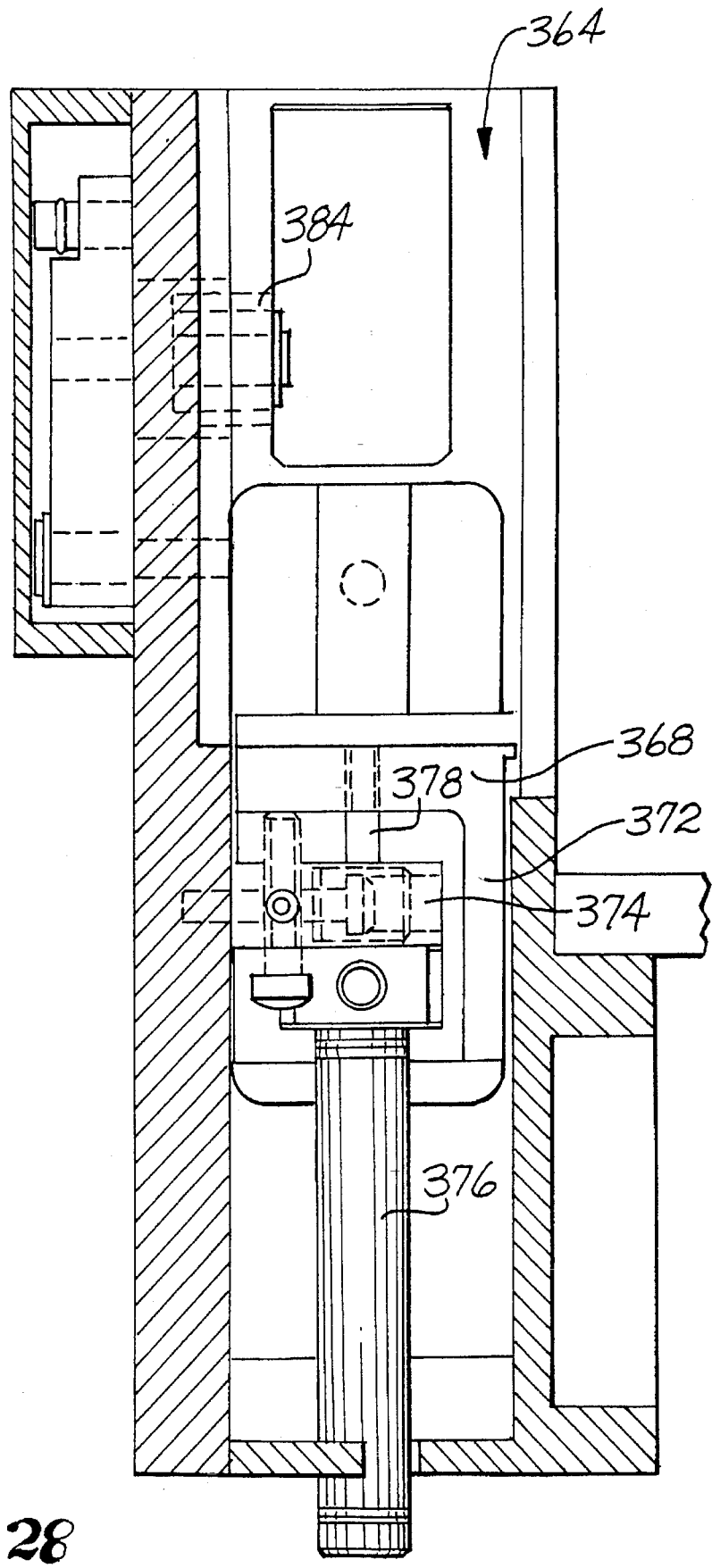
FIG. 28. is a sectional elevation of a portion of the clip presenter along lines 28—28 in FIG. 27.

A clip presenter 360 is mounted at the front end of the module 60 for receiving clips 18 pushed in from the clip cartridge 340, and for lifting and aligning the clips 18 to an index position to be gripped by the gripper module 52. The parts presenter, shown in FIG. 27, includes a clip presenter housing 362 having an outwardly and upwardly opening central cavity 364 positioned and aligned opposite to the channel of the clip cartridge 340 when it is latched into the cartridge bed 312 for receiving clips 18 one at a time as they are pushed into the cavity 364 from the cartridge 340 by the pusher bar 328.

An elevator 366 is positioned in the floor of the cavity of 264 and includes an elevator body 368 having depending sides 370 and 372 of for guidance of s vertical motion in the cavity 364. A block 374 is attached to the sidewall of the cavity 364 and supports an air cylinder 376, and an air fitting (not shown) connects an air supply line to the cylinder 376 for pressurizing the cylinder and extending a piston rod and the attached elevator body 368 to the limit indicated by the upper limits of a recess 380 milled in the side of the cavity 364.

Figure 31:
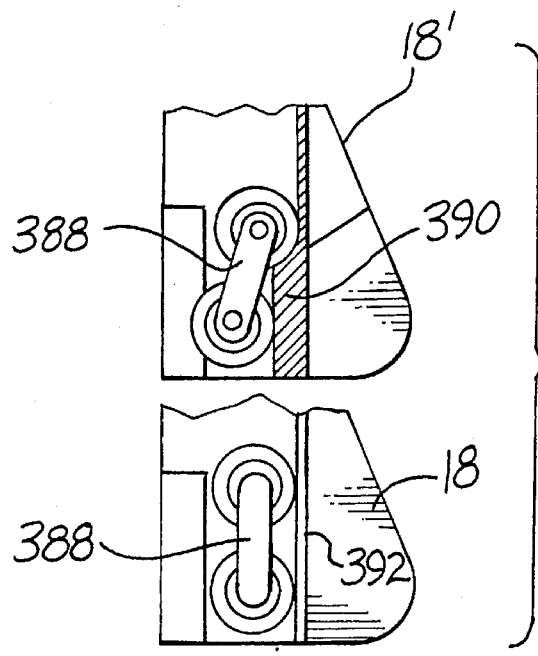
FIG. 31 is a schematic view of the articulated rollers shown in FIG. 30, showing their function with a clip having a flat web and a clip having a stepped web.
Figure 30:
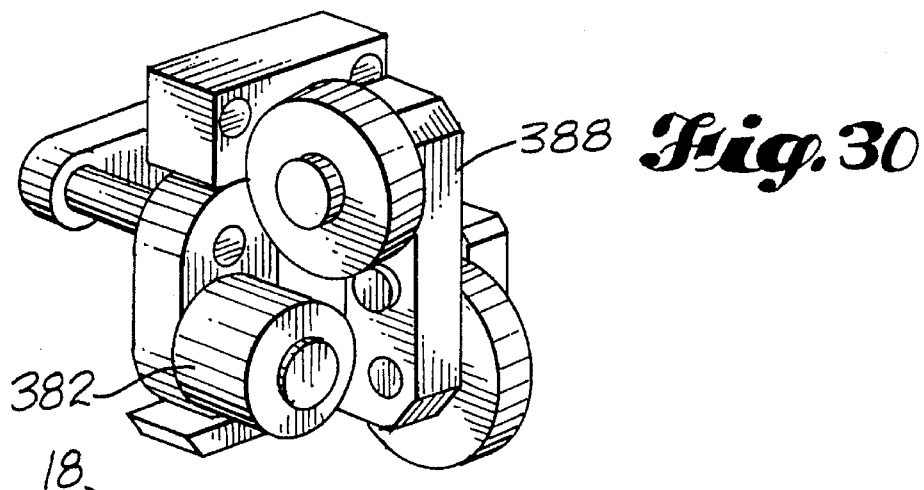
FIG. 30 is a perspective view of the articulated rollers and the back roller in the parts presenter shown in FIG. 27.
Figure 29:
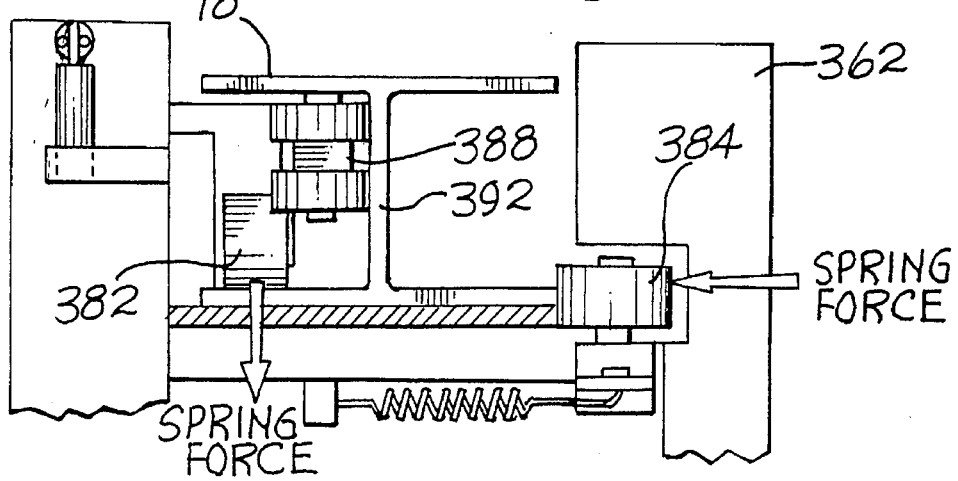
FIG. 29 is a schematic plan view of the clip presenter shown in FIG. 27, illustrating the function of the rollers.
Figure 32:
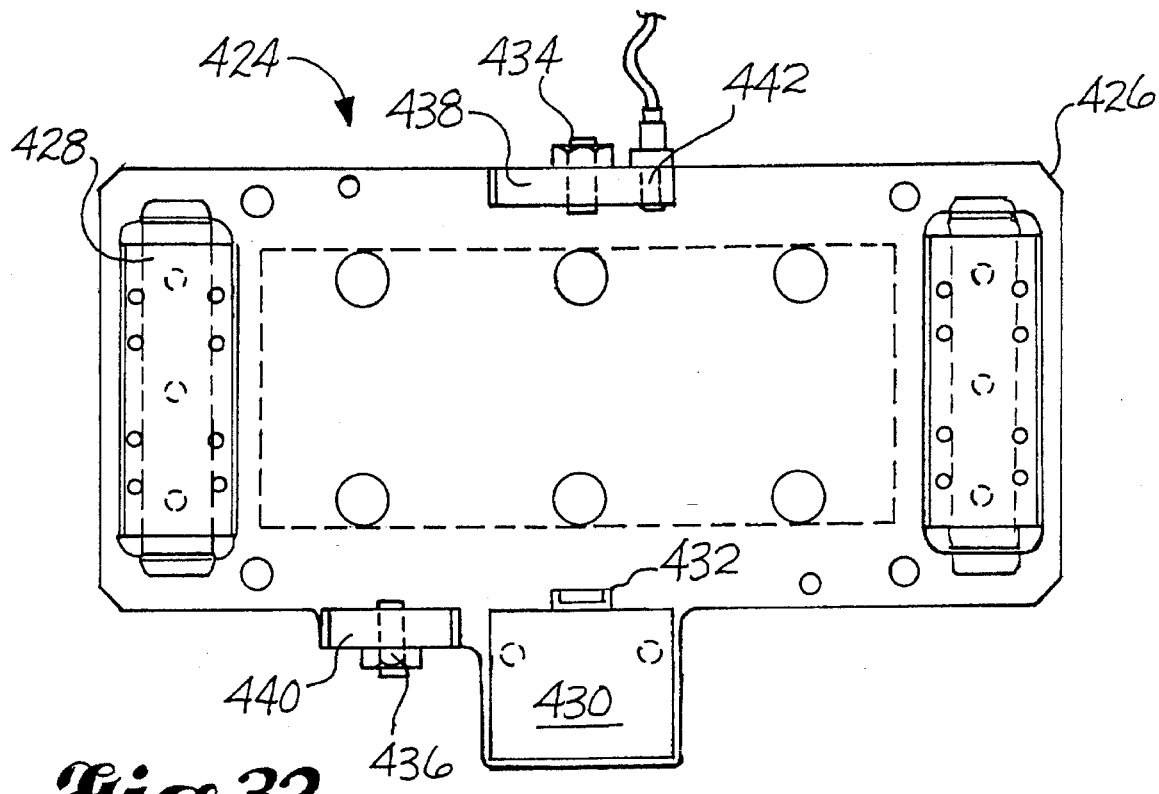
FIG. 32 is a front elevation of a positional mounting plate for the drill units of the clip-to-stringer modules shown in FIG. 5.

When the clip 18 is raised by the elevator 366, a spring loaded roller 382 presses the clip against the inner face of the cavity 364, and another spring loaded roller 384 engages the lower protruding lobe 386 of the clip 18 and pushes the clip 18 against a pair of articulated rollers 388. The articulated rollers establish the reference plane to which the clip 18 is to be moved and is allows the clips with a stepped webbed 390 to remain in the vertical position, as illustrated in the upper view of FIG. 31, as well as clips with a flat web flat web 392, as shown in the lower view of FIG. 31.

In operation, the clip cartridge 340 with a load of clips is inserted in the cartridge bed 312 and two holes 394 at the base of the end plate 344 are aligned with a pair of tapered location pins 396 mounted in holes 398 in the housing 362. The clip cartridge 340 is pushed against the face of the housing 362 and a spring loaded cam 400 mounted on the end of a shaft of 402 which in turn is mounted on the underside of the top plate 314, snaps into place behind the end plate 344 to hold it in place against the face of the housing 362. When it is desired to release the clip cartridge, a handle 404 on the end of the shaft 402 is lifted to lower the cam and release the clip cartridge 340 for removal from the cartridge bed 312.

Figure 26:
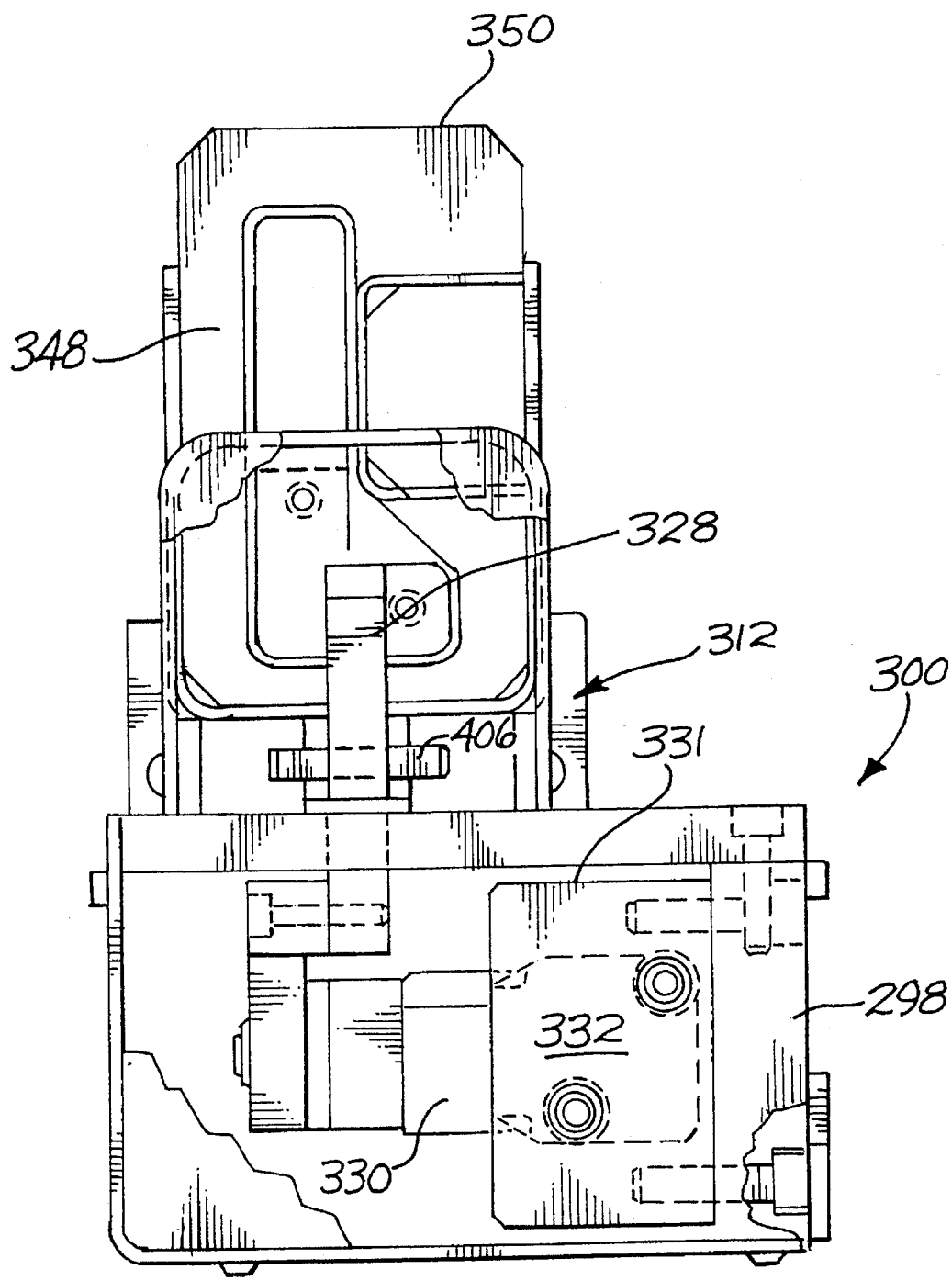
FIG. 26 is an elevation along lines 26—26 in FIG. 24.

With the clip cartridge 340 latched in place, the machine at the appropriate time energizes the rodless cylinder 332 to drive the shuttle 330 and the attached pusher arm 328 along the slot 326 and the cruciform slot 324 in the cartridge bed 312. The pusher arm 328 is guided in the cruciform slot 324 by two laterally spaced pins (only one which is shown is FIG. 26) extending through the pusher arm 328. The pusher arm 328 pushes the clips laterally toward the center line of the gripper module 52 and the inner clip enters the cavity 364. At the appropriate time, the air cylinder 376 of the elevator 366 is energized to raise the clip 18 to the index position. When the clip is raised, the roller 382 bears against the inside of the lobe 408 of the clip 18 to hold the clip against the inner face of the cavity 364, and the roller 394 bears against the outside curved surface of the lobe 386 of the clip 18 to push the clip against the indexing articulated rollers 388. The clip is now held in a accurately known index position for pickup by the gripper module 52.

When the gripper module has removed the clip 18 from the clip presenter 360, the air pressure in the air cylinder 376 is reversed to lower the elevator 366, and the air pressure in the cylinder 302 is reversed to retract the piston and its attached piston rod 306 into the cylinder 302 to withdraw the clip feeding and presenting module 60 from its forward position back to its retracted position.

The clip to frame coordination hole drilling module 54 and the clip to stringer hold modules 58 and 58' are based on the same structure used in the centering and channel floor drilling module 50.

Turning back to FIG. 6, the modules 50 and 54 each have an identical drill unit 410 which includes a drill motor 412, a connector housing 414 rigidly connected to the drill motor 412 and a quill housing 416. A drive belt in the connector housing 414 connects a sheave fastened to the motor shaft to another sheave connected to a parallel drill drive shaft (not shown) rotatably supported in a quill 417. The quill is longitudinally supported in the quill housing 416 and can be advanced and retracted in the housing 416 by air pressure delivered through fittings 418 and 420 respectively. The feed speed of the quill 417 in the quill housing 416 is adjustable to allow rapid feed toward the work piece and then slow drilling feed as the drill contacts and drills through the work piece. The drill units 410 for the modules 50 and 54 are commercially available under the trade name Suhner BEM Monomaster.

The opposed clip-to-stringer hole drilling modules 58 and 58' use similar drill units from the same source, but use a slightly more powerful motor because they each drill 2 holes simultaneously. Each of the drill unit 422 and 422' on the modules 58 and 58' is mounted on a positional mounting plate of 424 the plate 424 is mounted on the mounting plate 68 secured to the front end extension of the frame bridge 64.

Figure 33:
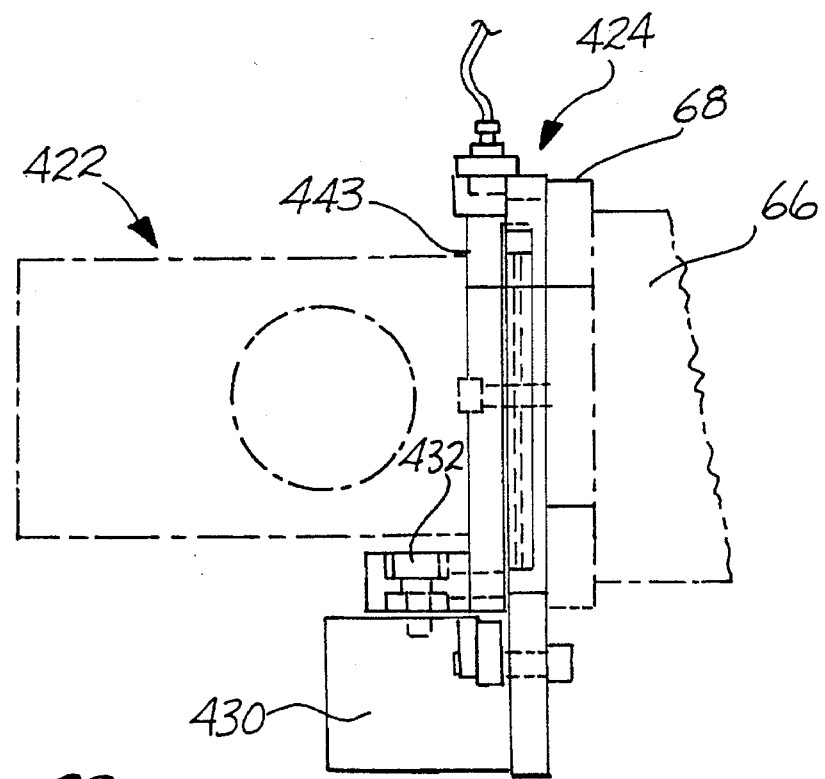
FIG. 33 is an end elevation of the positional mounting plate shown in FIG. 32.

The positional mounting plate 424 includes a pair of linear bearings 426 and 428 to which the drill units 422 are fastened as indicated by the dotted lines in FIG. 33. The linear bearings 426 and 428 prevent limited vertical motion of the drill unit 422 under control of air cylinder 430 to enable the vertical position of the holes drilled are the drill units 422 and 422' to be elevated slightly when the clip 18 is to be placed in the stringer 14 at the position of a joggle, or step in the base of the stringer 14. The cylinder 430 has a piston rod 432 which bears against the underside of the drill unit 422 to lift the drill unit 422 vertically upward when then air cylinder 430 is pressurized. An upper adjustable stop of 434 and a lower adjustable stop 436 are attached to flanges 438 and 440 respectively at the upper and lower edges of the positional mounting plate 424. A sensor 442 is mounted in the flange 438 in line to sense the upper edge of the base plate 444 by which the drill unit 422 is attached to the positional mounting plate 424. The sensor 442 sends a signal to the control system that the drill unit 422 is its raised position so that operation of the unit 422 to drill holes in the stringer and clip at a joggle position may proceed.

A conventional gearbox 444 is mounted on the end of the quill 417 and the drill shaft is coupled to the input shaft of the gearbox. The gearbox 444 has internal gearing that drive a pair of parallel collets which hold parallel drills for drilling two holes simultaneously in each side of the stringer 14 and the clip 18 held in place by the jaws of the gripper module 60.

Figure 34:
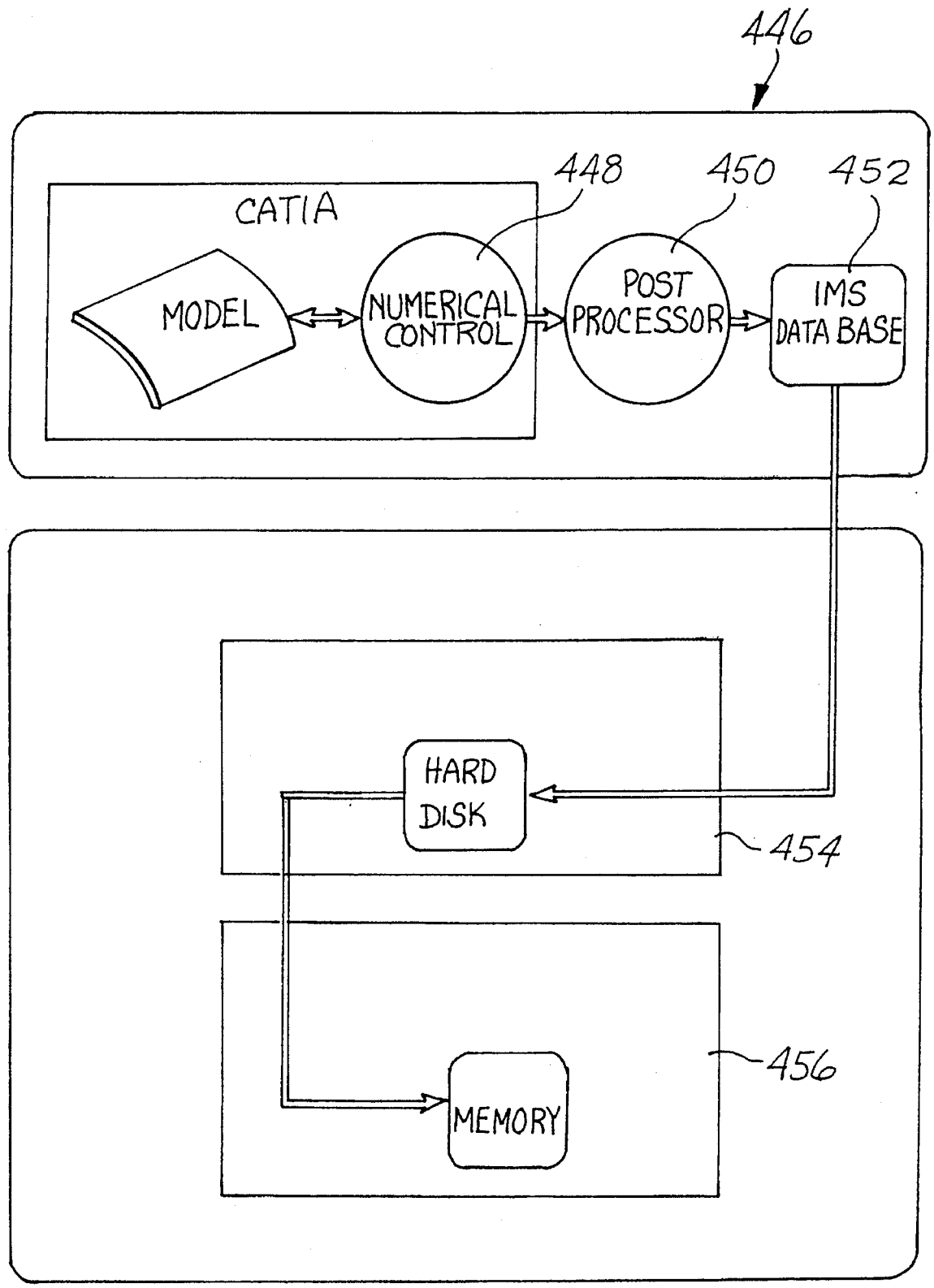
FIG. 34 is a schematic of the computer architecture of the invention shown in FIG. 1.

Turning now to FIG. 34, the computing architecture for control of the machine is shown schematically to include computer functions which are performed on the CAD/CAM main frame 446 where the original engineering digital product definition is recorded and available as the ultimate product definition authority. A numerical control 448 converts this data into a form that is usable by a post processor 450, which converts the digital parts definition data into a form that is compatible with the computer controller for the machine and stores the parts information on an IMS Database 452. The IMS Database 452 is a large capacity storage bank for storing all the pads programs that will be used by the stringer/clip drilling machine.

The other computing functions are performed at computer hardware stations adjacent the stringer/clip drilling machine, and are performed by two separate computer hardware units, an HP 9000/710 MDMS DNC server 454, and the machine controller 456 which in the case of the preferred embodiment is an Allen Bradley 9/260 CNC. The server 454 is connected to the IMS database 452 through a suitable computer connection such as a phone connection such as a DEC DEMSA and a DEC Microvax SNA Gateway, or preferably through an Ethernet TCP/IP.

In operation, the clip cartridge 344 is first loaded, as illustrated in FIG. 35, by inserting clips 18 into a cartridge from the open front end of the cartridge in reverse order from which the clips 18 are to be removed, that is, "last in, first out" order. The loaded cartridge, illustrated in FIG. 36, is loaded onto the cartridge bed 312 by aligning the holes 394 in the cartridge end plate 344 with the locating pins 396 on the housing 362 and sliding the cartridge 344 against the face of the housing 362 until the cam latch 400 snaps behind the end plate 344 to hold it in position, as shown in FIG. 38.

A stringer 14 is loaded onto the stringer holding fixture 104 and is secured against the end stop 106, as shown in FIG. 6, by a clamp at the other end of the stringer. In the fixture 104, the stringer 14 is positioned under the line of action of the spreaders 110 and the drill quill 130 of the drill 126, as shown in FIG. 39. To ensure that the drill 126 drills a coordination hole in the floor of the stringer 14 where specified (usually in the center) the spreaders are plunged into the channel 20 of the stringer 14 by the cylinders 118 as shown in FIG. 40, and are rotated 90° as illustrated in FIGS. 41 and 42 to center the stringer under the centerling of the drill 126. The air cylinder in the quill housing for the drill 126 is now pressurized by the control system and the quill plunges into the stringer channel 20 to drill a coordination hole 10 in the floor of the stringer 14.

After drilling, the quill 130 is retracted and the servomotor 86 is energized to move the carriage to the next hole position, where the next hole is drilled automatically. All the coordination holes are drilled in the floor of the stringer in this manner and the carriage is moved back to the home position in preparation for insertion and drilling of the stringer clips 18.

Figure 44:
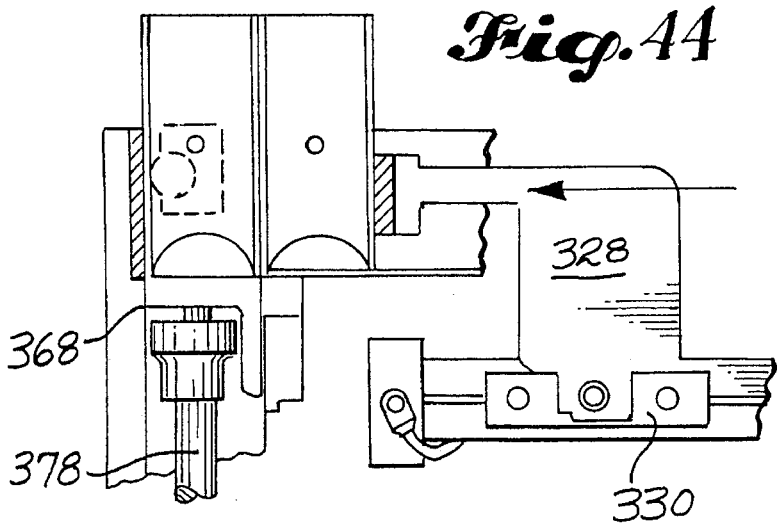
FIGS. 44–48 are schematic views showing the process used by the machine shown in FIG. 1 of indexing a clip to a reference position for pick-up by the gripper module.
Figure 45:
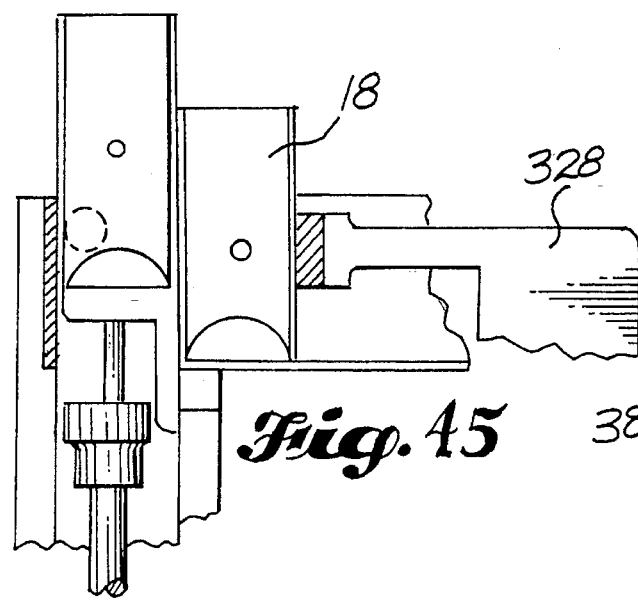
Figure 46:
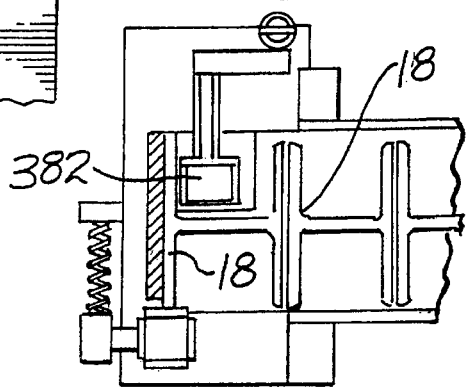
Figure 47:
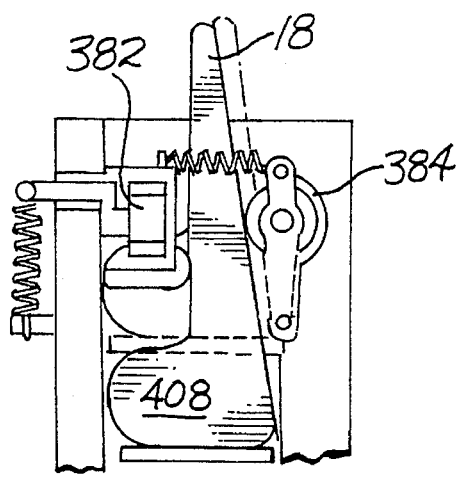
Figure 48:
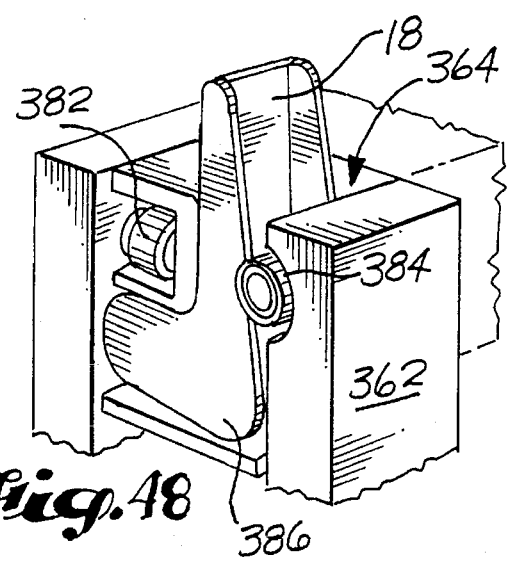
Figure 49:
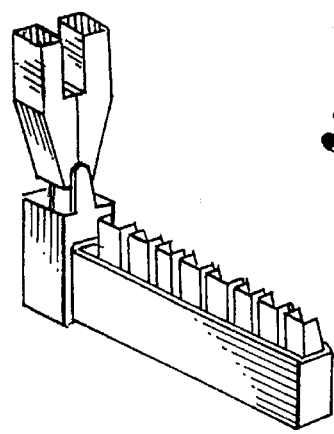
FIGS. 49–51 are schematic views of the process used by the machine shown in FIG. 1, of drilling a clip-to-frame coordination hole and preparing to insert the clip into the stringer channel.

On signal from the control computer 456, clip feeding and presention module is moved inward by a signal to the air valve that controls the air to the air cylinder 302, and the module 60 slides inward on the linear bearing 290. Simultaneously, the rodless cylinder 332 is pressurized, moving the shuttle 330 and the pusher arm 328 to the left in FIG. 44, pushing the stack of clips 18 to the left and pushing the first clip into the central cavity 364 of the clip presenter 360. The air cylinder 376 is pressurized by the control computer 456 opening the appropriate valve, and the piston rod 378 extends to raise the elevator body 368, as shown in FIG. 45, to the index position. As the clip rises in the central cavity 364, the roller 382 engages the inside face of the lobe 408 to hold the clip against the inside face of the cavity 364, as shown in FIG. 46, and the roller 384 engages the edge of the lobe 386 to push the clip against the index surface established by the articulated rollers 388, as shown in FIGS. 46–48. The rollers and the elevator 366 position the clip precisely in an index position to be gripped and lifted by the gripper module The servomotor 194 of the gripper module 60 is commanded by the control computer to drive the ball screw 188 to lower the gripper jaws 234 over the clip 18. As the module 60 descends, the air cylinder retracts the piston and withdraws the rod 208 and the connected jaw cam 224 upward. The spring 240 opens the jaw 234 so that the jaw is open when it reached the index position of the clip 18. The precise feedback system of the servomotor 194 enables the computer controller 456 to position the jaw 234 at precisely the right height to pick up the clip 18 with an exactly known portion of the clip extending below the jaw 234 for positioning in the stringer channel 20. The air pressure in the air cylinder 206 is reversed, lowering the rod 208 and driving the jaw cam against the jaw roller 232, closing the jaw 234 on the clip 18, as shown in FIG. 49.

Figure 50:
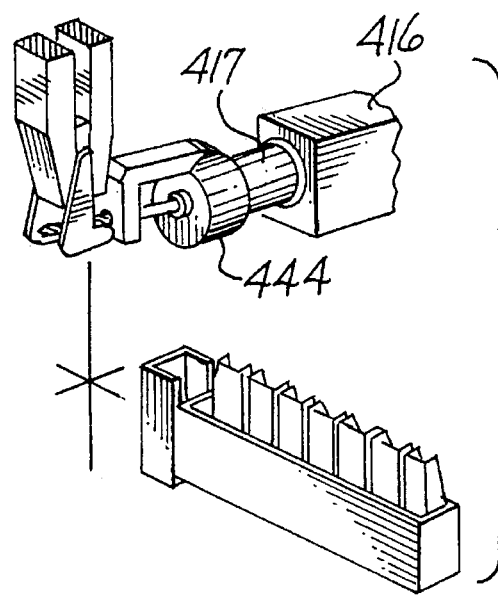
Figure 51:
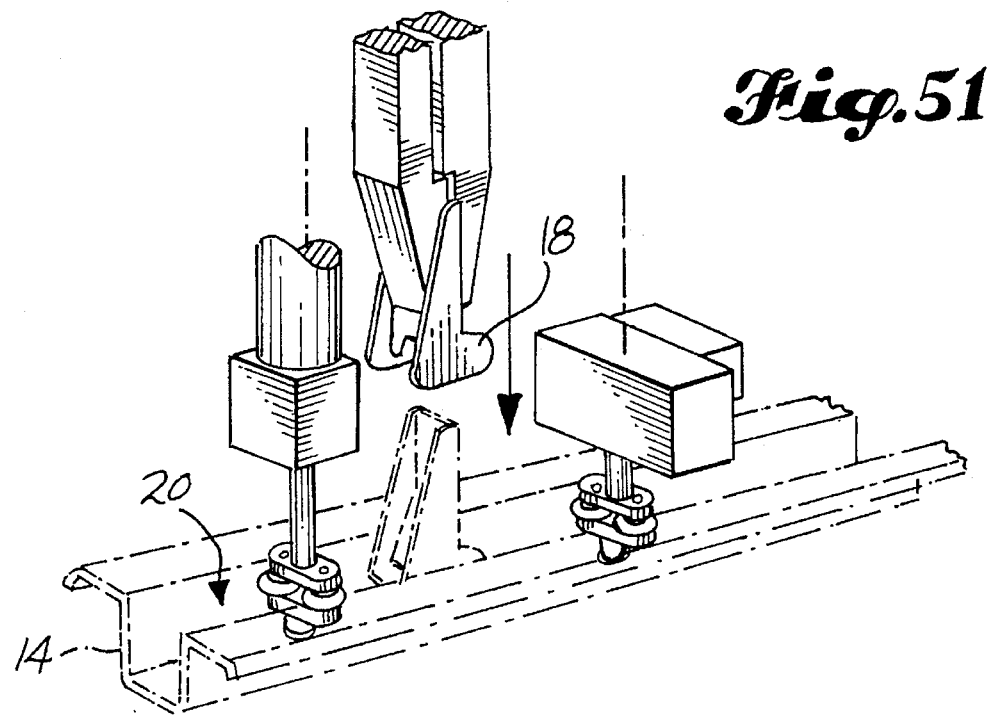
Figure 52:
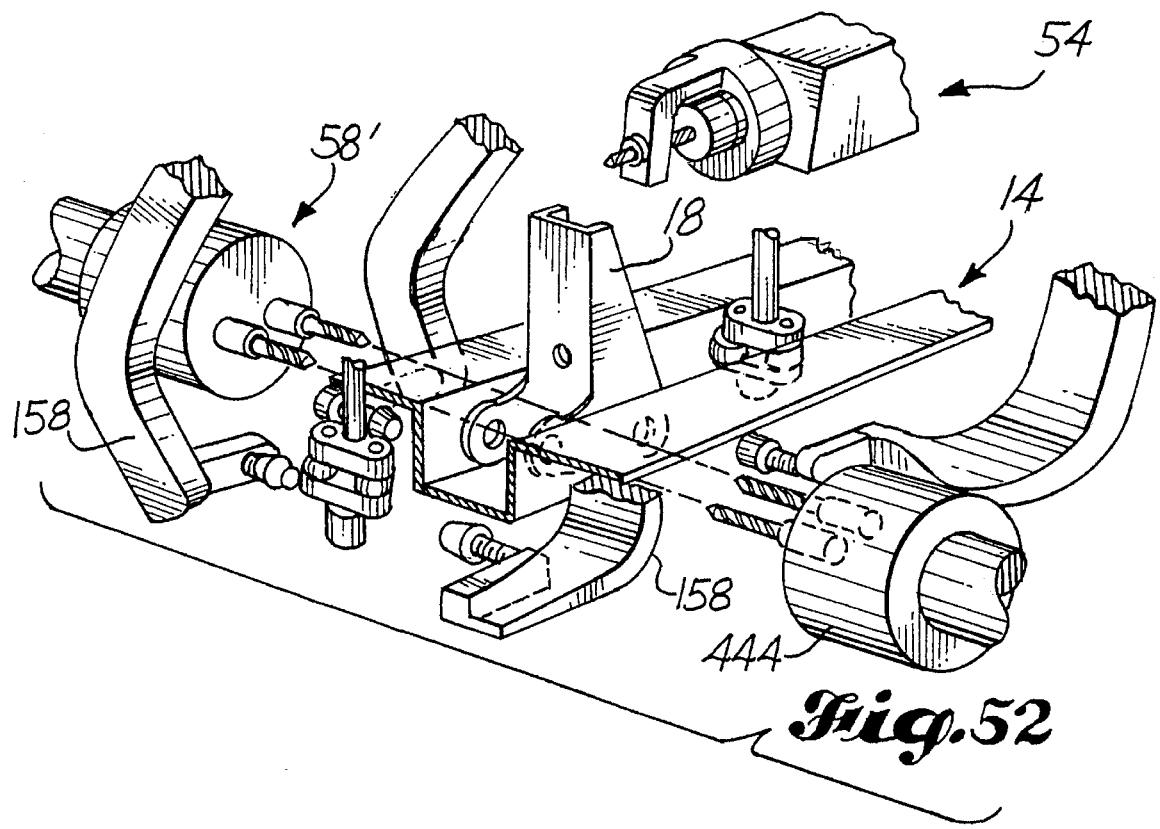
FIGS. 52 and 53 are schematic views showing the process used by the machine shown in FIG. 1 of spreading the stringer channel and inserting the clip for drilling.
Figure 53:
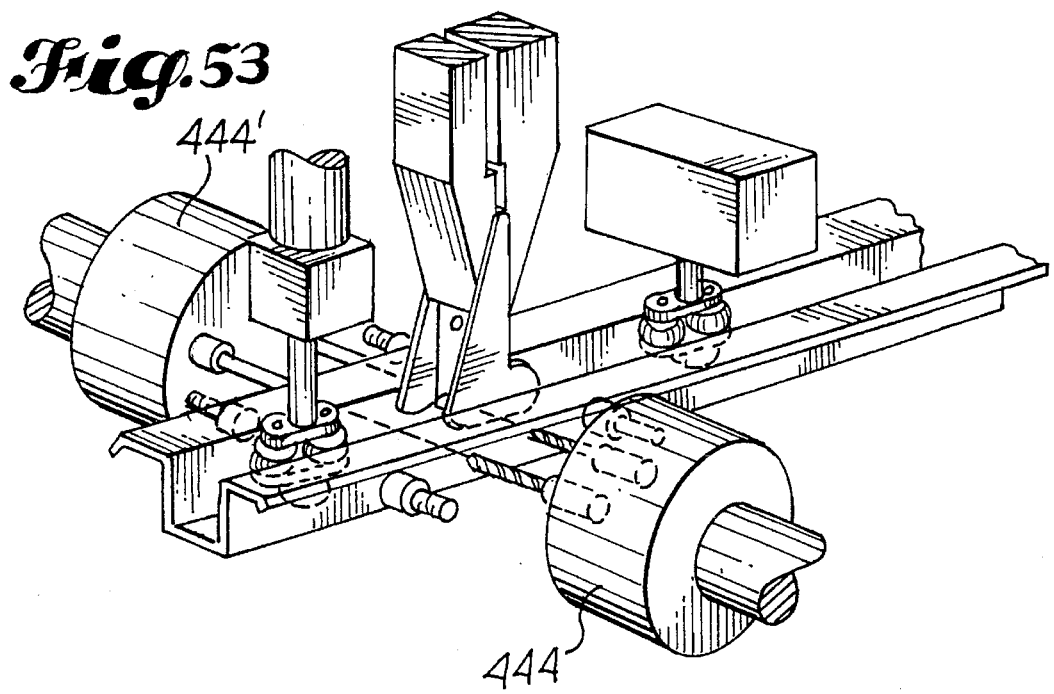

The computer controller 456 now commands the servomotor 194 to drive the ball screw 188 to raise the jaw 234 and the gripped clip 18 out of the central cavity 364 and up to a position opposite the clip-to-frame hole drilling module 54, as illustrate in FIG. 50. The cylinder in the quill housing 416 is pressurized on command of the computer controller 456 and the quill 417 advances and drills a hole through the clip 18 while it is held in the correct position by the jaws 234. To prevent an excessive moment from being exerted on the clip 18 while it is being drilled, a slot 235 is cut in the center of the ends of the jaw 234 and the facing jaw on the clamp body 214, and the coordination hole is drilled through the slot.

The clip feeding and presenting module 60 is withdrawn away from the gripper module by pressurizing the opposite side of the cylinder 302 to extend the piston rod and push the housing 300 back along the rail 296. When the computer controller is informed that the housing 300 is withdrawn, by a signal from a sensor in the bearing block 292, the servomotor 194 is reversed to rotate the ball screw to drive the gripper module and the gripped clip down toward the channel 20 of the stringer 14. Simultaneously, cylinder 270 of the rear stringer centering and clamp-up module 56 is pressurized to lower the spreader 269 into the channel 20 of the stringer 14, and the cylinder 118' of the centering and floor drilling module 50 is pressurized to lower the spreader 110' into the channel 20 of the stringer 14. Both rotary actuators 122' and 262 are pressurized to rotate the spreaders 110' and 269 by 90° to spread the sidewalls 24 of the stringer 14 to facilitate the entry of the clip as it is carried into the channel 20 by the gripper module.

When the computer controller detects that the clip has reached the correct position in the channel 20, it commands the clamp actuator cylinders 162 and 256 to close the clamp arms 158 and 252 on the sidewalls 24 of the stringer to press the sidewalls against the sides of the clip 18, thereby increasing the security of the position against any slippage while the stringer and clip are being drilled, and also eliminating drilling burrs between the clip and the stringer sidewalls. When the sensors 172 257 in the clamp bracket 160 and 250 indicate that the clamp has closed, the computer controller turns on the drill motors on the drill 422 and 422' and pressurizes the air cylinders in the quill housings to advance the quills toward the stringer. The two parallel drills in each gearbox 444 simultaneously drill the four holes through the stringer sidewalls 24 and the stringer clip 18, and then retract. The computer controller commands the jaw to release the clip and retract and the clamps release the stringer sidewalls, and the module 56 retracts. The cycle is then repeated until all the clips 18 are place in the stringer at the designated positions in the engineering part definition and drilled, and the computer controller 456 commands the carriage to retract to home position. The controller signals the the operator that the operations are completed and the stringer is ready for removal from the holding fixture and replacement with the next stringer.

Obviously, numerous modifications and variations of the described preferred embodiment will occur to those skilled in the art.

Accordingly, it is expressly to be understood that those modifications and variations, and the equivalents therof, may be practiced while remaining within the spirit and scope of the invention defined in the following claims, wherein we claim:

1. A machine for positioning clips in channel-shaped airplane fuselage stringers, and drilling holes in said stringers and clips, comprising:

an elongated beam support;

a carriage assembly positioned on said beam and supported for longitudinal movement therealong;

a motive mechanism for moving said carriage along said beam;

an index mechanism for indexing a stringer on said beam at a fixed reference position thereon;

a centering mechanism mounted on said carriage for centering said stringer under a vertical axis of said drill system;

a drill system mounted on said carriage for drilling a series of vertical holes along a channel floor of said stringer at locations specified in a digital product definition of said part;

a clip feeding mechanism for feeding clips to be positioned in said stringer;

said drill system including a pair of opposed drills disposed on a horizontal axis orthogonal to said stringer axis for drilling through side walls of said stringer and said clip positioned in said stringer; and a gripper for gripping, moving and placing a series of clips in said stringer channel and holding said clips in a specified position while they are drilled by said opposed drills;

a position feedback and control system for receiving product definition information from a central product definition repository and translating said product definition information into machine instructions for moving elements of the machine to correct positions for drilling holes in said stringer and stringer clip to match corresponding holes drilled in airplane fuselage panels and frames to enable said parts to be positioned accurately with respect to each other without use of hard tooling.

2. A machine as defined in claim 1, wherein:

said drill system includes a separate drill on a horizontal axis for drilling clip-to-frame holes in said clip.

3. A machine as defined in claim 1, further comprising:
a parts positioner mounted on said carriage for receiving said clips and for positioning clips at a specified position to be gripped and picked up by said gripper, 4. A machine as defined in claim 1, further comprising:
a probe, normally stowed in a probe holder adjacent one end of said beam;
a series of indexes connected to said beam
a subroutine of machine instructions in said control system which, when activated, instruct said carriage to move to a position adjacent said probe holder, and instruct said said gripper to pick up said probe, and touch said indexes in series to establish the positions of said indexes along said beam relative to each other and relative to a home position of said carriage.

5. A machine as defined in claim 1, wherein:
said gripper includes a pair of jaws and a closing actuator for closing said jaws to grip objects in said gripper, and a rotator for rotating said gripper about a vertical axis.

6. A machine as defined in claim 1, wherein said centering mechanism includes:
a pair of roller paddle elements having a narrow dimension and a wide dimension;
a pair of vertical motion translators for moving said roller paddle elements vertically into and out of said channel;
a pair of paddle rotators for rotating said roller paddle elements through an angular displacement to engage said wide dimension of said roller paddle elements with said side walls of said stringer to spread said side walls apart to facilitate the insertion of said stringer clip.

7. A machine as defined in claim 1, wherein said motive mechanism includes:
a servomotor having a drive shaft driven by said motor and a pinnion gear connected to the drive shaft for rotation therewith;
a position detector including a longitudinal scale affixed to said beam support and a sensor attached to said carriage in a position to sense longitudinal position information recorded on said scale, for detecting the longitudinal position of said cariage on said beam support; and
a feed back communication channel between said position detector and said control system to provide longitudinal position information of said carriage along said beam support to said control system.

8. A machine as defined in claim 1, wherein said clip feeding mechanism includes:
a clip cartridge for holding a stack of clips in order to be loaded into a stringer.

9. A machine as defined in claim 8, wherein said clip feeding mechanism includes:
a feeder are movable along a slot in said clip cartridge to push said clips through said cartridge.

10. A machine as defined in claim 1, wherein said parts positioner includes:
a first roller to hold said clip against a first reference plane, and a second roller to hold said clip against a second reference plane.

11. A method of drilling coordination holes in a channel-shaped airplane stringer and stringer clip, comprising:
inserting said stringer against a stop on an elongated beam under a vertical axis of a drilling machine, with said channel of said stringer opening upward;
inserting a pair of centering devices into said channel and actuating said centering devices to center said stringer under said machine axis;
drilling a hole in said stringer with said drilling machine;
feeding a clip in a clip feeder to a vertical axis of a gripper;
gripping a stringer clip with said gripper and lifting said clip out of said cartrige;
drilling a clip-to-frame hole in said clip while said clip is held by said gripper;
rotating said gripper to orient said clip for correct insertion into said channel of said stringer;
inserting a pair of spreaders into said stringer channel and actuating said spreaders to open said channel slightly;
lowering said gripper with said clip and inserting said clip into said stringer channel.

12. A method of drilling coordination holes as defined in claim 11, wherein:
said centering devices include roller paddle elements, arranged on spaced parallel vertical axes lying in a plane also containing said machine axis, and rotatable about said vertical axes, said roller paddle elements having a narrow dimension which fits within said channel without contacting said channel walls, and a wide dimension that is wider than the width of said channel;
said step of actuating said centering devices includes rotating said roller paddle elements to engage said wide dimension of said roller paddle elements with said stringer channel walls to center said stringer under said parallel vertical axes.

* * * * *

UNITED STATES PATENT AND TRADEMARK OFFICE
CERTIFICATE OF CORRECTION

PATENT : 5,477,596

DATED : December 26, 1995

INVENTOR(S) : Hugh R. Schlosstein and Peter D. McCowin

It is certified that error appears in the above-identified patent and that said Letters Patent is hereby corrected as shown below:

On the title page, in item [75], "James D. McCowin" should be
   --Peter D. McCowin--.

Signed and Sealed this

Thirteenth Day of August, 1996

Attest:

BRUCE LEHMAN

Attesting Officer     Commissioner of Patents and Trademarks